United States Patent [19]

Asai et al.

[11] Patent Number: 5,072,377
[45] Date of Patent: Dec. 10, 1991

[54] DATA DRIVEN PROCESSOR WITH DATA PAIRING APPARATUS COMBINING A HASH MEMORY WITH COUNTER DIRECTIONAL DATA LOOPS

[75] Inventors: Fumiyasu Asai; Shinji Komori, both of Hyogo, Japan

[73] Assignee: Mitsubishi Denki Kabushiki Kaisha, Tokyo, Japan

[21] Appl. No.: 121,516

[22] Filed: Nov. 17, 1987

[30] Foreign Application Priority Data

Nov. 19, 1986 [JP] Japan .............................. 61-277040

[51] Int. Cl.[5] ............................................. G06F 15/82
[52] U.S. Cl. .............................. 395/400; 364/232.22; 364/256.3; 364/247.4; 364/DIG. 1
[58] Field of Search ........................... 364/200, 900

[56] References Cited

U.S. PATENT DOCUMENTS

| | | | |
|---|---|---|---|
| 4,674,034 | 6/1987 | Iwashita et al. | 364/200 |
| 4,807,182 | 2/1989 | Queen | 364/900 |
| 4,814,978 | 3/1989 | Dennis | 364/200 |
| 4,841,436 | 6/1989 | Asano et al. | 364/200 |
| 4,918,644 | 4/1990 | Terada et al. | 364/900 |
| 4,943,916 | 7/1990 | Asano et al. | 364/200 |
| 4,953,083 | 8/1990 | Takata et al. | 364/200 |

OTHER PUBLICATIONS

Watson et al., "A Practical Data Flow Computer," *IEEE Computer*, (Feb. 1982), pp. 51–57.

*Primary Examiner*—Gareth D. Shaw
*Assistant Examiner*—Maria Napiorkowski
*Attorney, Agent, or Firm*—Wolf, Greenfield & Sacks

[57] ABSTRACT

A data driven processing system includes a mechanism for generating a data pair from a sequential input data stream by matching identifier fields. The pairing mechanism comprises a hash memory in which input data words to be paired are stored by using hashed addresses. If a hash collision occurs, the data word which caused the hash collision is transmitted to a counter-directional data loop which is used to generate a data pair. If an input data word is not paired after one pass through the data loop it is returned to the hash memory for another pairing operation. Use of both the hash memory and the counter-directional data loop reduces the required hash memory size and increases processing efficiency.

28 Claims, 17 Drawing Sheets (CONTENTS OF OCCUPATION FLAG)

DATA DRIVEN PROCESSOR WITH DATA PAIRING APPARATUS COMBINING A HASH MEMORY WITH COUNTER DIRECTIONAL DATA LOOPS

BACKGROUND OF THE INVENTION

This invention relates generally to a mechanism for generating a data operand pair from sequentially input data by matching data identifier fields and, more particularly, to a firing processing unit in a data driven processor.

A conventional von Neuman data processing system, uses a control driven sequential processing method in which operands for a specific instruction are specified within the control word for that instruction. Consequently, the upper bound of processing speed in such a system is limited by the data transmission speed between central processing unit and memory unit and further it is difficult to achieve parallel processing. In order to overcome these difficulties, non-von Neuman data processing systems have been proposed. These non-von Neuman systems include data processing systems which use data driven type data processing methods. Some data driven type data processing systems using such methods have been implemented. For example, FIG. 17 shows a schematic diagram of such a data driven type data processing system. In this system, a data process such as an operation which combines two operands is achieved by first locating and pairing the two operands and then activating a data processing unit to complete the operation after the data has been paired. Referring to FIG. 17, the principle is applied, for example, to a dyadic operation for data 30 having an identifier field 29a and a value A and data 31 having an identifier field 29b and a value B. The operation is initiated by comparing the identifier fields 29a and 29b with the identifier field comparator unit 32 and generating a data pair 34 with the data pair generator unit 33 when the identifier fields indicate that the data pair are operands for the operation (this pairing process is hereinafter referred to as "firing"). Data processing unit 35 then performs the operation on the paired data. It is also possible that more than two data words must be associated in order to perform a particular operation. In this latter case the association of data words preparatory to performing an operation is still referred to as "firing".

Prior Art 1

An example of a data driven type data processing system is described in Oki Electric Researches and Development Report pp. 19-26, published in June 1984.

FIG. 18(A) shows a schematic diagram of the data association unit or firing processing unit of said example. In this example, a waiting or template matching memory for data to be associated (firing operation) is used to hold a set of data words, each of which constitutes one operand for an operation. Each data word provided to the system contains an identifier field at least part of which is used as an address to access the template matching memory. If the memory location indicated by the address information is empty, the input data word is stored at that location. Subsequently, another input data word which constitutes another operand for an operation and which has an identifier field that specifies the same memory location will access that location so that a data word pair can be generated.

In order to reduce the size of the template matching memory, the data words are stored in the holding memory by using a hashing operation on the input data word identifier field to generate the memory addresses. In accordance with conventional hashing algorithms, the input addresses are reduced into a smaller subset of addresses. However, when this is done, there exists the possibility that different input addresses will be hashed into the same memory address resulting in a hash "collision". Hash collisions are detected by comparing a special part of the stored data word with the same part of the input word. In the memory, address chain fields are appended to each data word as shown in FIG. 18(A) to deal with hash collisions. In the case of a hash collision, the stored data is searched sequentially by referring to the addresses indicated by said chain fields.

Prior Art 2

An example of another implementation of a firing processing unit has been filed by the same assignee as the subject invention (reference is directed to Japanese Patent Application No. 119166/85). A schematic diagram of this latter example hereinafter referred to as a "counter directional date loop firing unit" is shown in FIG. 19. Data packets to be processed, including data words and associated identifier fields, are transferred from the main data transmission line to a loop data transmission line 38 via junction unit 36 or the loop data transmission line 39 via junction unit 37. Junction units 36 and 37 operate in such a manner that one operand for an operation is transferred to loop transmission line 38 and another operand is transferred to loop transmission ling 39, Both loop data transmission lines 38 and 39 are comprised with free running shift registers and are arranged so that data within loop 38 circulates in the opposite direction from data in loop 39. As the data words in one loop circulate past the data words in the other loop, the identifier fields of the data words in one loop are compared by a firing direction unit provided in predetermined stages cf the shift registers to the identifier fields of data words in the other loop and when a match is detected, paired data are generated and transferred to the main data transmission line via branch unit 40 for the next operation. Until the pairing operation is completed, the data stay on the data transmission lines 38 or 39.

In the example of prior art 1, stored data to be paired must be searched by tracing the address indicated by the chain field when a hash collision occurs and there is a problem that the processing time required to generate one data pair becomes very long when the frequency of occurrence of hash collisions increases. Consequently, when a small memory with hashed addresses is used, the total processing efficiency of the data processing system is severely decreased. On the other hand, if a memory of larger capacity is used in order to reduce the probability of hash collisions then the use of a hashing method to reduce memory size is meaningless.

In the example of prior art 2, as the number of data words to be paired increases, the loop data transmission lines must be extended because more data words must circulate on each loop before matches are detected. Such a situation increases the period of time that the data remain on the data transmission lines, the turn around time becomes longer and the response to input from outside of the processor is slower.

Therefore, the object of this invention is to provide a data processing system which can solve the above problems and generate a data air by searching through the data to be paired with higher speed using less hardware.

SUMMARY OF THE INVENTION

This invention provides a firing processing unit having reduced hardware requirements and high speed by using combination of a hashed template matching memory and a counter directional data loop data pair generating mechanism.

The identifier field of a data word being input to the data processing system of subject invention is compressed in its bit width (by means of a hash operation with a predetermined rule) in order to generate a hashed template matching memory read out address. The template matching memory which holds data words constituting operands is accessed by using said hashed memory read out address. If the identifier field of the read out data matches the identifier field of the input data, a new data pair is generated from said two data words and is output.

On the other hand, if the identifier fields of the input word and the read out data word are mismatched with each other, the input data is transferred to a counter directional data loop data pair generating mechanism as it is. In the counter directional data loop data pair generating mechanism, the identifier fields accompanying the data transferred in opposite direction in the transmission lines are compared with each other by the identifier field comparator means provided at predetermined shift register stages and when the result of comparison is a match, a new data pair is generated from the two data words present in the corresponding shift register stages.

In this invention, since a hash memory is used as a data waiting memory (template matching memory) for firing operations, a memory having small capacity can be used.

Further, even when a hash collision occurs, since the data is immediately transmitted to the counter directional data loop data pair generating mechanism, the next input data word can be received immediately. Therefore, even if a hash collision occurs, no sequential search operation using chain fields is necessary, and the overall reduction of processor efficiency is small.

In the counter directional data loop data pair generating mechanism, since comparisons of the identifier fields are executed at the shift register transmit speed, the processing rate is sufficient to accommodate data resulting from hash collisions. Further, the capacity of the counter directional data loop data pair generating mechanism (the number of stages of the shift register) may be small since only the data resulting from a hash collision concurrently need be processed by the counter directional data loops.

As described above, by combining a template matching memory and counter directional data loop data pair generating mechanism, a firing processing unit having high processing efficiency and small hardware requirements can be provided. As a result, a data processing system having higher speed and decreased hardware requirements can be manufactured

Figure 18A:
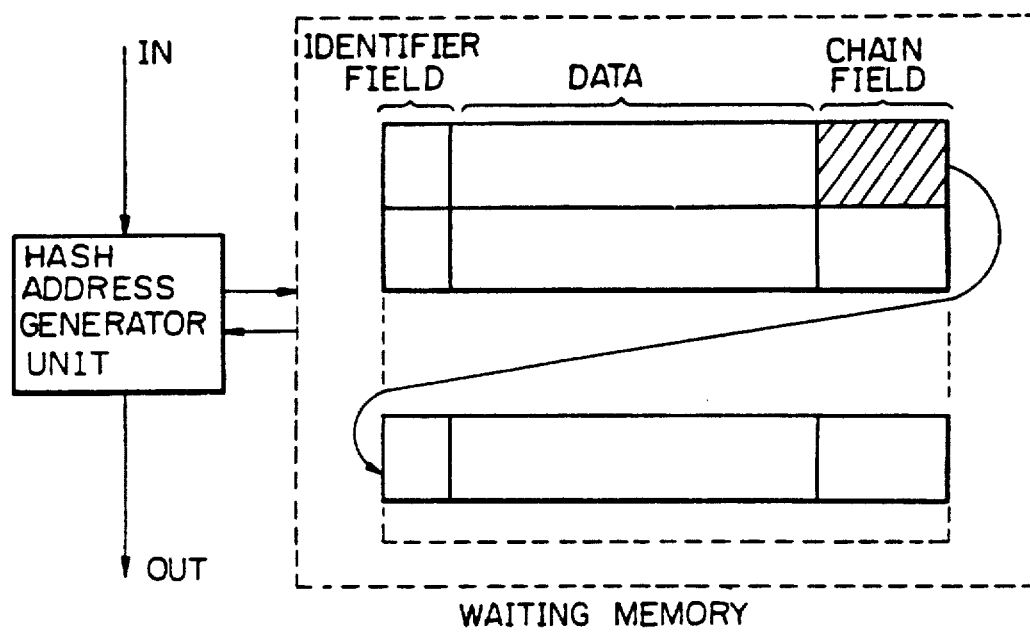
Figure 18B:
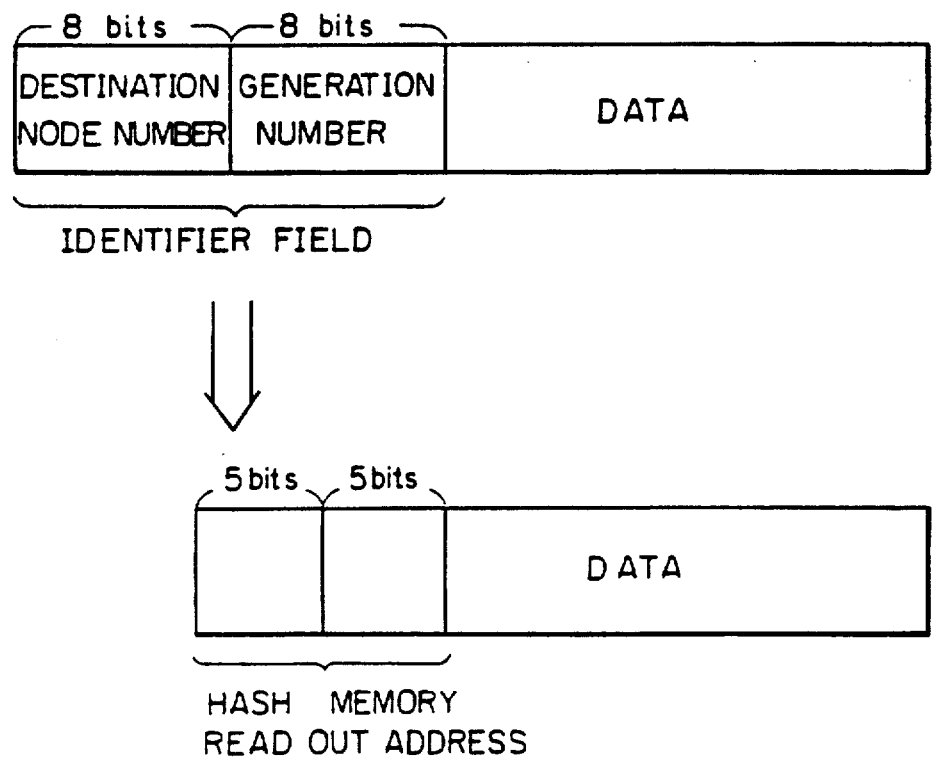
Figure 19:
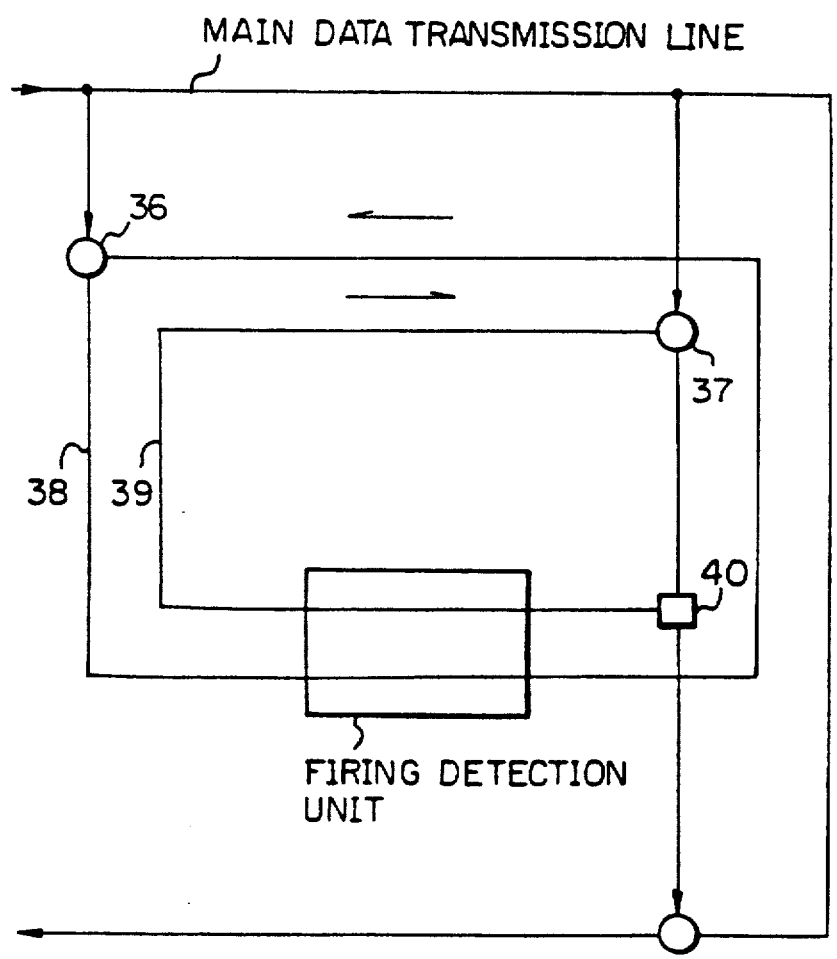

FIG, 18(A) is a diagram of a template matching or data waiting memory which uses hashed addresses;

FIG. 18(B) is a diagram illustrating an exemplary hashing method for use with the inventive system; and FIG. 19 is a schematic diagram for explaining the prior art 2.

DETAILED DESCRIPTION OF THE INVENTION

Figure 1:
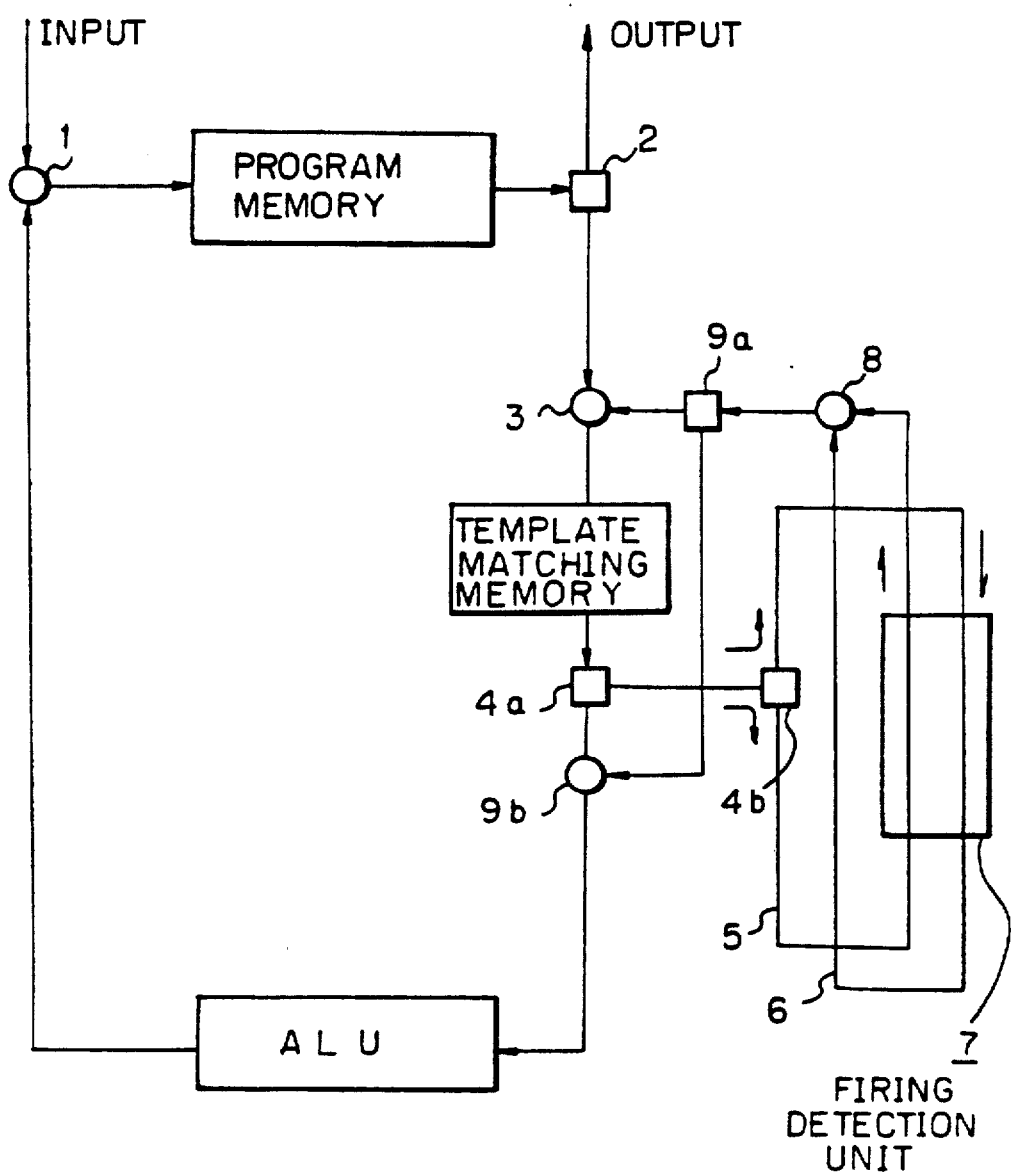
FIG. 1 is a schematic diagram showing the example of a data processing system to which subject invention can be applied.

FIG. 1 is a schematic diagram of a data processing system according to the subject invention. Data entered from an external unit reaches a program memory via junction unit 1 in which an operation code or generation number and a destination node number that are read out from the memory are appended to the data. The data is then provided to a template matching memory via branch unit 2 and junction unit 3 and is processed by a hashing operation. Now the hashing operation will be described with reference to FIG. 18(B). Assume that the bit specification as shown in the drawing is assigned to the input data as an identifier field. Considering this identifier field as an input address to the template matching memory, a memory with a $2^{16}$ address space is required for this case. Accordingly, in order to reduce the size of the memory required, a hashed memory input address is formed by combining the low order 5 bits of the destination node number and the low order 5 bits of the generation number. After this operation, the required address space becomes $2^{10}$, that is, it is reduced to $2^{10}/2^{16}$ namely 1/64 th of the unhashed memory size.

Referring again to FIG. 1, the template matching memory is accessed in accordance with the hashed memory read out address formed by degenerating the bit width of the input address.

In the location of the template matching memory designated by the hashed address, there are data information fields. These include a flag designating whether or not valid data is stored in the location (occupation flag), the high address bits of the input address omitted during the hashing operation (when valid data is present), and the actual data (value of the data field). If the result of a read to the location in the template matching memory indicates that the occupation flag is off, then the first data word to be paired has not yet arrived. In this case the value of high order address field bits and the value of data field of the input data are written into this address and at the same time the occupation flat is set to "on".

On the other hand, if the occupation flag is already on, the high order address field of the input data word is compared to the high order address field stored at the accessed memory location. If the values of high order address fields match, a data pair is formed by appending the read out data field to the input data field and the combined data fields are output and at the same time the occupation flag is reset to "off".

In case where the values of high order address fields are mismatched (namely a hash address collision occurs , the input data is output as it is and the memory location is not updated.

Figure 2:
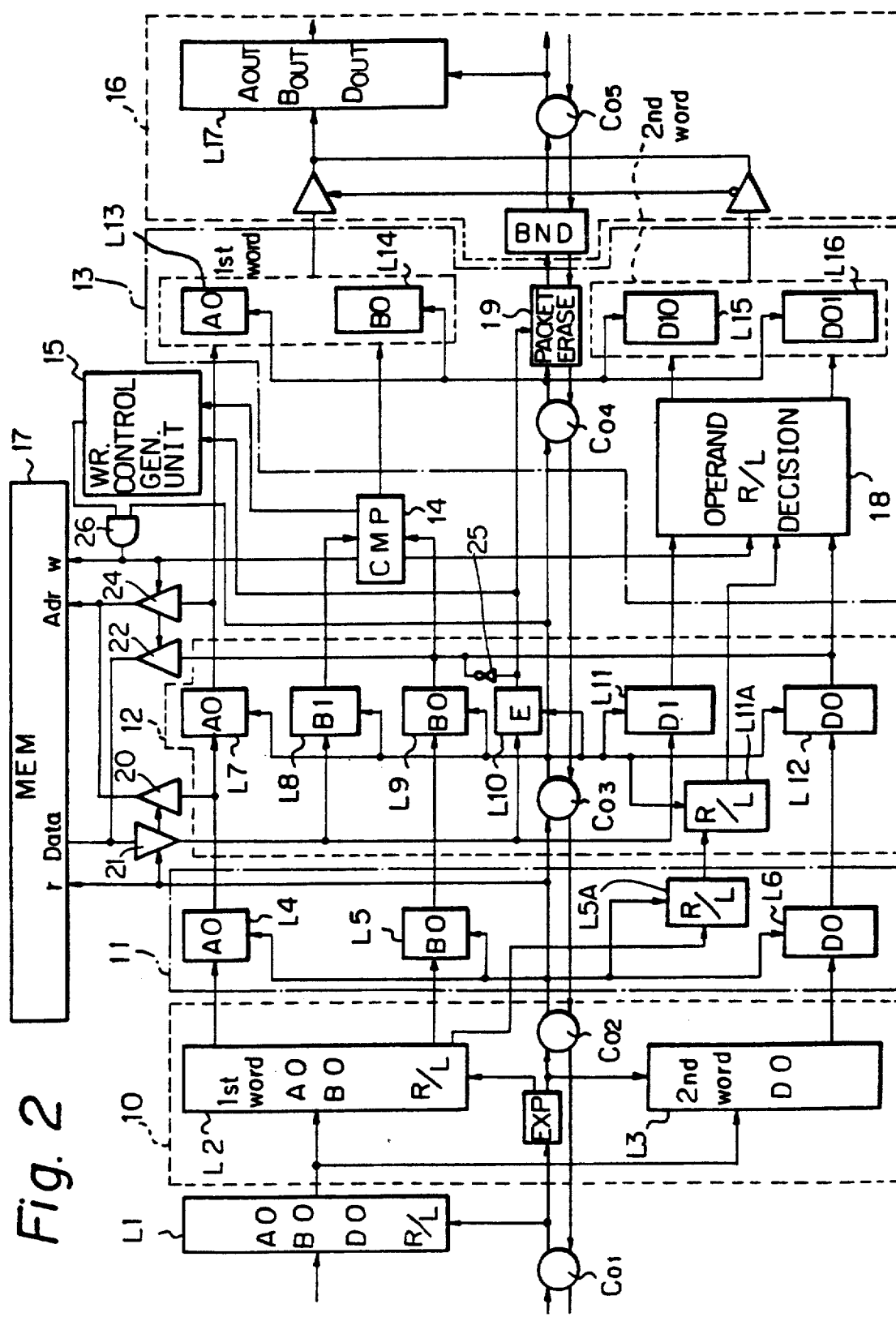
FIG. 2 is a block diagram of a template matching memory.
Figure 3:
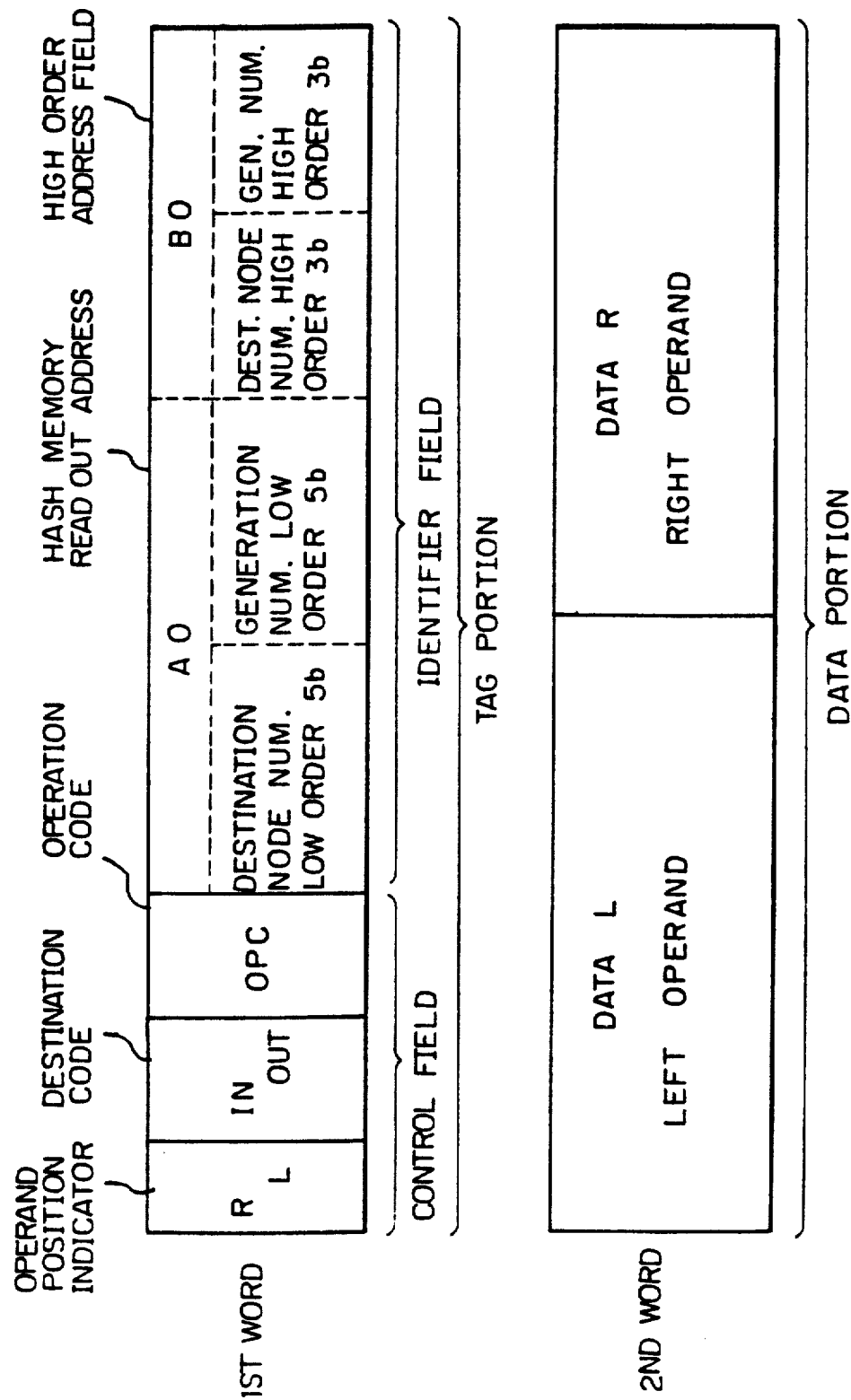
FIG. 3 is a diagram showing an example of input data format.

FIG. 2 shows a block diagram of the construction of the template matching memory. As shown in the drawing, the template matching memory is constructed of a data branch unit 10, an input unit 11, an output latch unit 12, a data pair generator control unit 13, a high order address field comparator unit 14, a write control signal generator unit 15, a data junction unit 16 and a memory unit 17. Reference characters $C_{01}$ to $C_{05}$ designate coincidence or C elements which control the flow of information between the various units and will be described hereinafter. The input data are formated in the packet form shown in FIG. 3. The tag portion is composed of a control field and an identifier field. The control field is composed with an operand position designator portion (R/L) for indicating whether the operand is a left operand or a right operand, a designation code portion for indicating whether a data pair is generated or not and an operation code portion for indicating the kind of operation. The identifier field is composed of an 8 bit destination node number and an 8 bit generation number.

The input data packet consisting of the low order address portion A0, the high order address portion B0 and data portion D0 is latched into an input holding latch L1 under control of a latch signal generated by coincidence element $C_{01}$.

The hashed memory read out address, hereinafter referred to as A0, is composed by concatenating for example the low order 5 bits of the 8 bit destination node number and the low order 5 bits of the 8 bit generation number. This is equivalent to applying the following hash function h to each of the destination node number and generation number of the input data in order to obtain a hash number which is the residue of $32(2^5)$.

$$h(n) = \mod(n\ 32);$$

where n is the address of input data

The value of high order address field stored in the template matching memory is composed from the high order bit information of th address of the input data which was omitted during the generation process of the hashed memory read out address Generally the original address of the input data is obtained from the hashed information and a hash reverse function.

In this embodiment, the value of high order address field is comprised of the high order 3 bits ($b_5 b_4 b_3$) of the destination node number and the high order 3 bits ($b_2 b_1 b_0$) of the generation number. Hereinafter this value is referred to as B0 ($b_5 b_4 b_3 b_2 b_1 b_0$). The original address of the input data is obtained by the computation $A0 + B0 \times 32$. Accordingly, in this embodiment, for matching the address of input data with the address of the read out data ($A0 + B1 \times 32$), it is sufficient that only B0 and B1 are compared. However, in this embodiment, since the operation for applying the above hash function is achieved only by selecting the high order 3 bits and the low order 5 bits of the destination node number and the generation number, respectively, the hash operation can be achieved by selectively connecting some of the data lines from the latch L2 to latches L4 and L5 in the FIG. 2. Further for simplifying the explanation, there is no indication relating to the destination code portion and the operation code portion of the tag portion in FIG. 2.

Figure 4A:
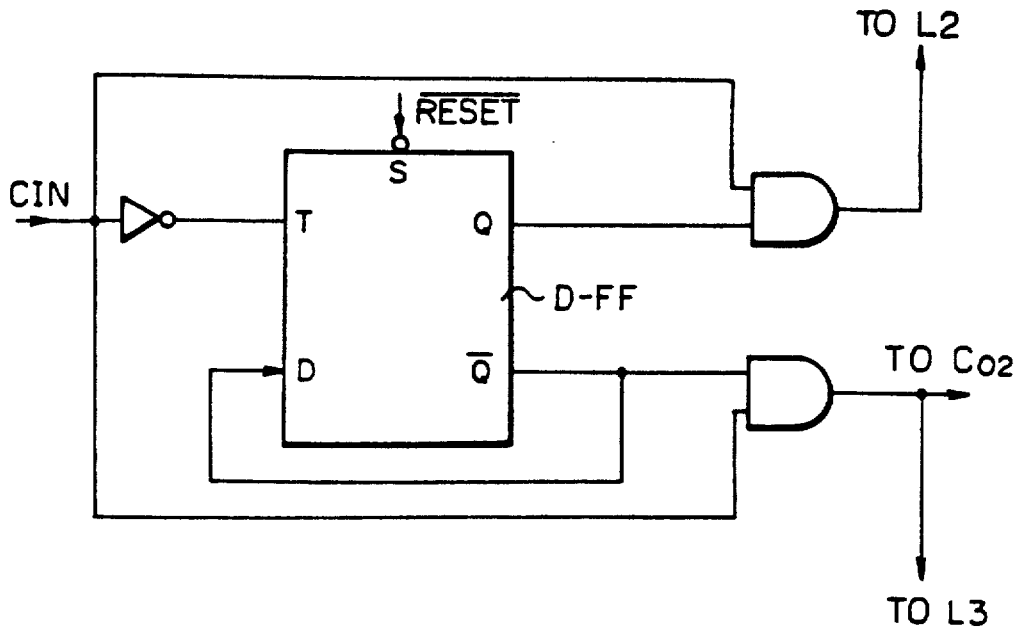
FIG. 4A is a diagram for explaining the EXP unit in the template matching memory.
Figure 4B:
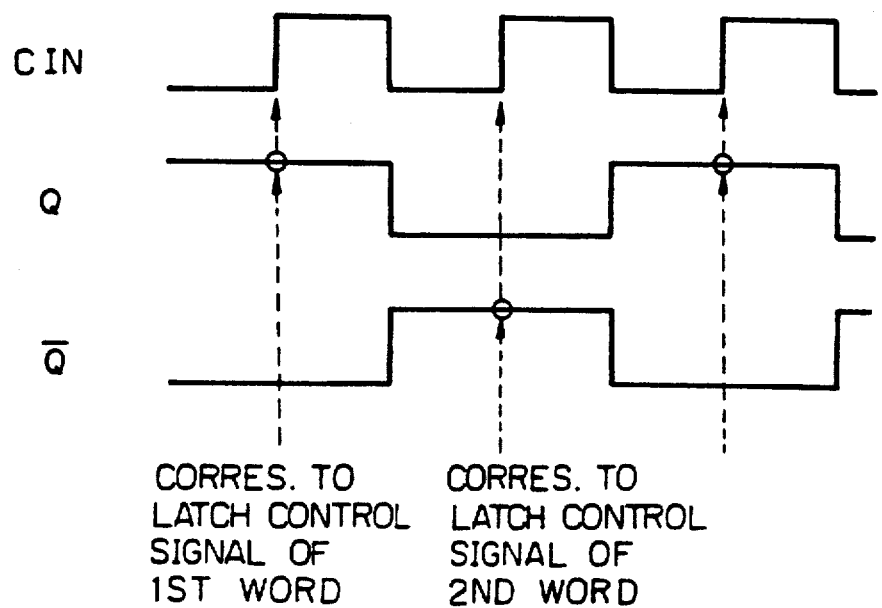
FIG. 4B is a timing diagram of the EXP unit.

The input data is separated into a first word including the identifier address field and a second word including the data portion within the data branch unit 10 in FIG. 2. The data is latched into branch unit 10 under control of a data latch signal generated by the EXP unit for such a branch operation. The EXP unit is comprised of a conventional D-type flip flop as shown in FIG. 4A. To the terminal CIN, an output signal from the previous C element, namely $C_{01}$, is input. Since the Q output is fed back to the D input, a reverse of the previous output signal is output to the Q and Q outputs on every rising edge of the signal input to the terminal T of the D-type flip-flop as shown in FIG. 4B. The flip-flop D-FF can also be reset by applying a low reset signal to the S input.

The input data packet consists of two words (FIGS. 3A and 3B) and always arrives in the order of the first word and the second word. An explanation of the operation of the branch unit 10 will start from the time when the first word reaches the latch L2 of FIG. 2. The Q output of the D-type flip-flop of the EXP unit is 1 for an initial state. Therefore, a latch control pulse for the first word is generated and applied to L2 via AND gate 410 having CIN signal as its other input. Since the CIN signal is inverted by inverter 420, the Q output of the D-type flip flop is reversed at the fall time of the latch control pulse of the first word. Therefore, the Q output is high when the second word arrives and the latch control signal of the second word is generated and applied to L3 via AND gate 430. Thus the first word (comprising the low order address portion A0, the high order address portion B0 and the operand position R/L) is latched in L2 and the second word (comprising the data portion D0) is latched in L3. Since the latch control signal of second word is sent to $C_{02}$, data in latches L2 and L3 is also latched in L4, L5, L5A and L6 of input latch unit 11 synchronized with the output of $C_{02}$.

The EXP unit repeats this operation for every ordered arrival of an input data packet.

Referring again to FIG. 2, a read signal at the output of $C_{02}$ is applied to the read input r of memory 17 and a hashed memory read out address A0 latched in latch L4 of the input latch unit 11 is input to the address input Adr of memory 17 (via driver 20) and the memory is read out.

Figure 5:
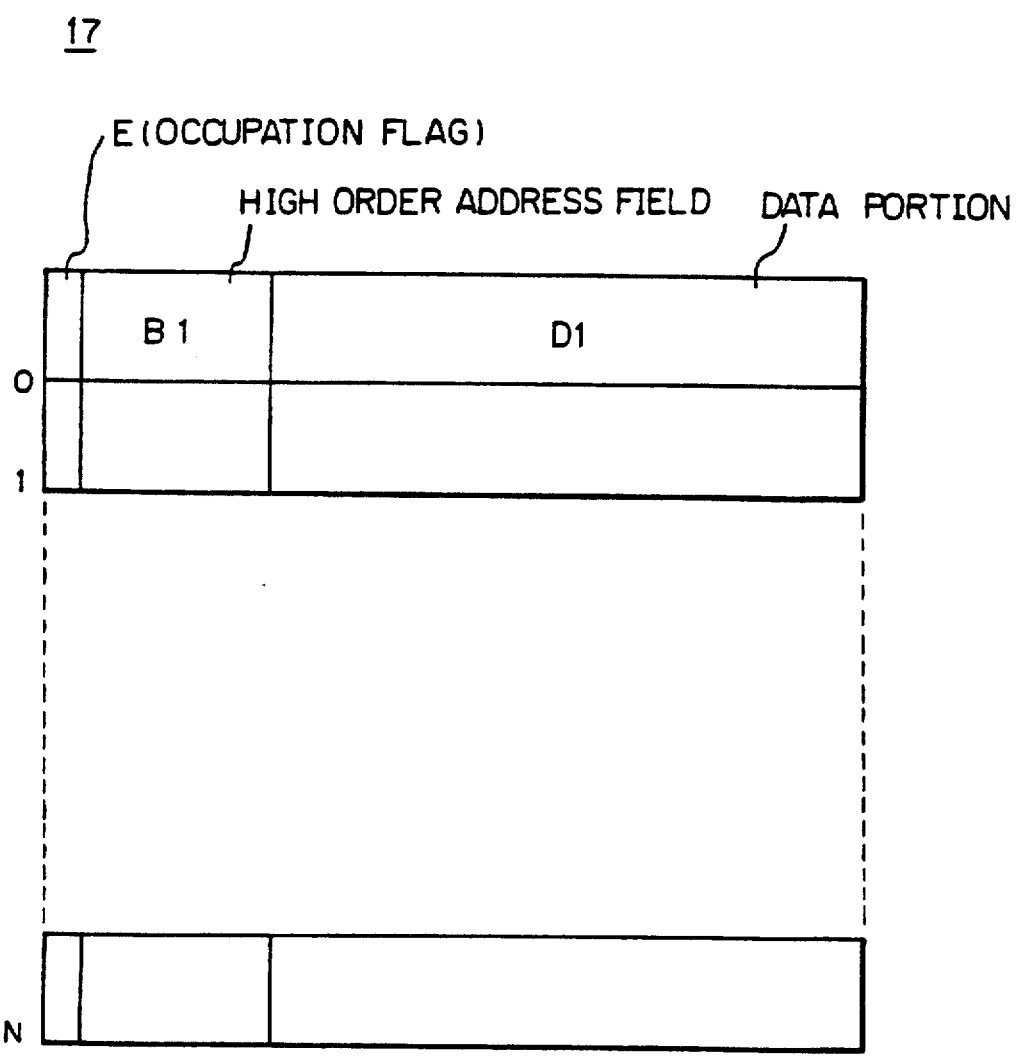
FIG. 5 is a diagram showing an example of format of the memory unit in the template matching memory.

The arrangement of data stored in memory 17 is shown in FIG. 5. Each word (of words 0 through N) in the memory is comprised of an occupation flag E designating whether there is valid data stored in the location or not, a field B1 (high order address field) of the input address masked at the hash operation and a data portion D1.

The data including high order address field B1, occupation flag E and data D1, read out from memory 17 from the Data input/output port through buffer 21 are latched in latches L8, L10 and L11 of FIG. 2, respectively, under control of a latch signal generated by coincidence element $C_{03}$. Also under control of the latch signal generated by coincidence element $C_{03}$, the low order address portion of the input data packet stored in latch L4 is transferred to latch L7, the high order address portion stored in latch L5 is transferred to latch L9, the operand position information stored in latch L5A is transferred to latch L11A and the data portion stored in latch L6 is transferred to latch L12 for further processing. After this, the operation of the system proceeds with reference to the value of the occupation flag E latched in the occupation flag latch L10. The value of the occupation flag in latch L10 is applied to write control generator unit 15, packet erase circuit 19 and, via inverter 25 and buffer 22, to the Data port of memory 17.

Figure 6A:
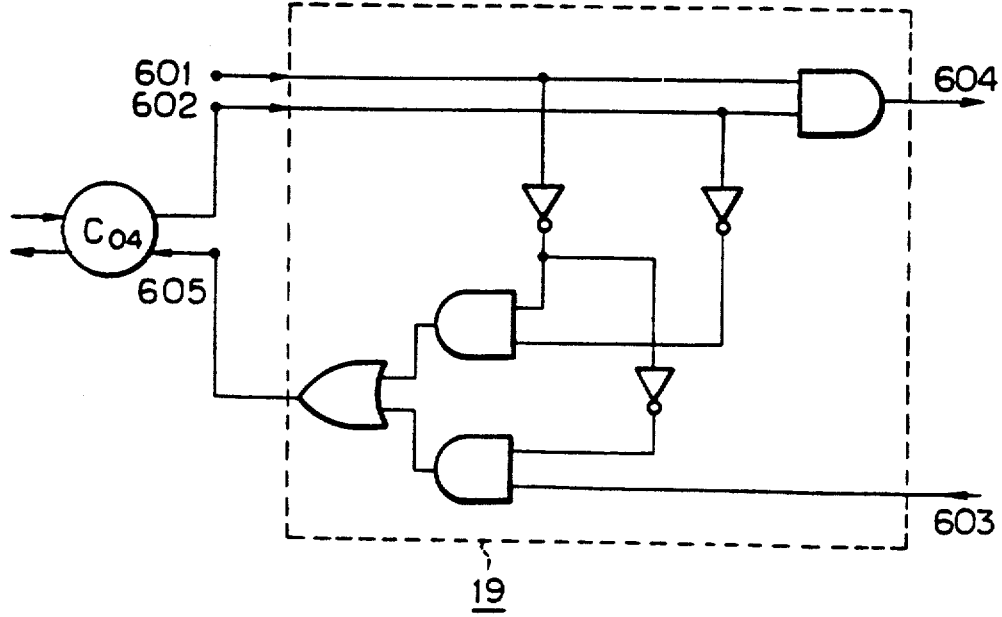
FIG. 6(A) is a logic diagram of the packet erase circuit in the template matching memory.
Figure 6B:
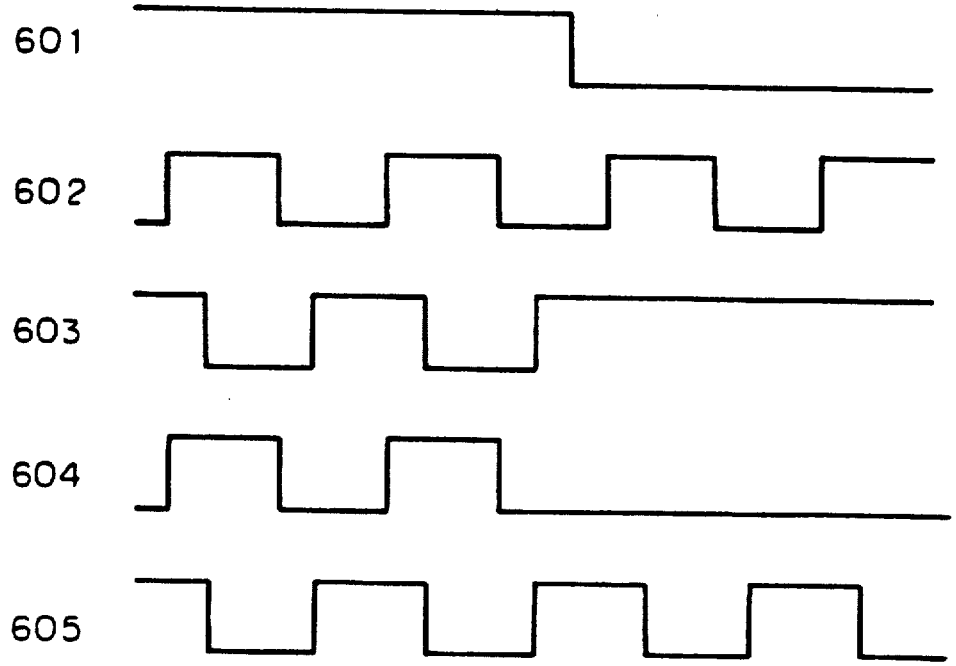
FIG. 6(B) is a timing diagram of the packet erase circuit in the template matching memory.

If the occupation flag E is off (0), denoting that there is no stored data for pairing with the input data, a write signal is generated by the write control signal generator unit 15. This write signal is applied to AND Gate 26 along with the latch signal generated by coincidence element $C_{03}$. The resulting write control signal generated at the output of gate 26 is applied to the write input w of memory 17. In response, the high order address and the data portion (B0, D0) of the input data are written into the memory as they are from the outputs of latches L9 and L12, via buffer 22, using the hashed address A0 latched in latch L7 and applied to the address input Adr of memory 17 via buffer 24. At the same time, for switching the occupation flag on, the write operation is executed with the occupation flag field set to a high level by inverter 25 at the output of L10. Further, at that time, the input data is substantially erased by applying a low level from latch L10 to the packet erase circuit 19 as a control signal. As will be hereinafter described, in response to this low signal, packet erase circuit 19 interrupts the transfer of information from unit 13 to unit 16, thereby causing the information to be erased during the next cycle. FIGS. 6A and 6B show the circuit arrangment and the logical and timing diagram of the packet erase circuit 19.

More particularly, referring to FIG. 6A, to the terminal 601, the content of the occupation flag latch L10 is applied. Similarly, to the terminal 602, a latch signal from the previous stage C element $C_{04}$ is applied and to the terminal 603, a signal corresponding to the latch empty signal from the latter stage C element is applied.

As shown in FIG. 6B, when the occupation flag is on, the terminal 601 is high. At that time, to the terminal 604, a signal applied to the terminal 602 is output as it is and to the terminal 605, a signal applied to the terminal 603 is output as it is. These signals cause the coincidence element $C_{04}$ to "handshake" with the next coincidence element and transfer data along to the next data processing unit.

Next when the occupation flag is off, the terminal 601 is low. At that time, a low signal is output to the terminal 604 and to the terminal 605, an inverted signal of the signal applied to the terminal 602 is output. Therefore, when the terminal 601 is low, the C element $C_{04}$ does not handshake with next stage C element for transferring data from data pair generator control unit 13 to data junction unit 16. Instead, the transfer is completed by a pseudo-response signal generated at output 605 of the erase circuit.

Referring again to FIG. 2, when the occupation flag is on (1), since data for pairing may have been read out, the high order address field B1 of the read out data stored in latch L8 and the high order address field B0 of the tag portion of the input data stored in latch L9 are compared with each other by comparison unit 14 to detect whether the read out data is to be paired with the input data.

If the result of such a comparison is a match and a data pair is to be generated, the low order address portion in latch L7 is transferred to latch L13 in the data pair generation unit 13 and the high order address portion stored in either latches L8 or L9 (the high order adress portions are equal) is transferred via comparison unit 14 to latch L14. In addition, the input data D0 in latch L12 and read out data D1 in latch L11 are transmitted to the operand R/L decision unit 18. This unit arranges the relative position of the two data words in accordance with the operand location information latched in the R/L operand position latch L11A and generates a concatenated data word. If the input data word (D0) is the "left" operand and the read out data word (D1) is the "right" operand, then the concatenated data word D01 is transferred to latch L16. On the other hand if the input data word is the "right" operand and the read out data word is the "left" operand, then the concatenated data word D10 is transferred to latch L15.

The appropriate concatenated data word (either D01 or D10) is transmitted to the data junction unit 16 along with the low order address field A0 (from latch L13 and the high order address field B0 (in latch L14) and the output data packet consisting of low order address bits $A_{out}$, high order address bits $B_{out}$ and data portion $D_{out}$ is generated in accordance with a control signal produced by the BND unit.

Figure 7A:
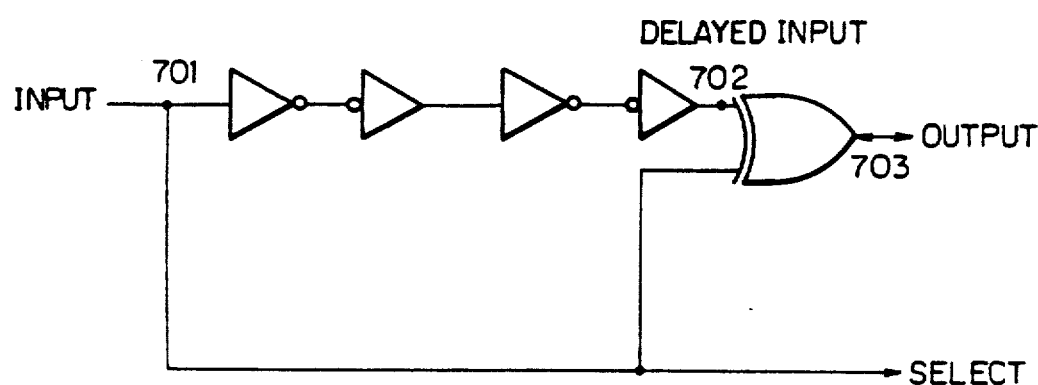
FIG. 7(A) is a logic diagram of the BND unit in the template matching memory.
Figure 7B:
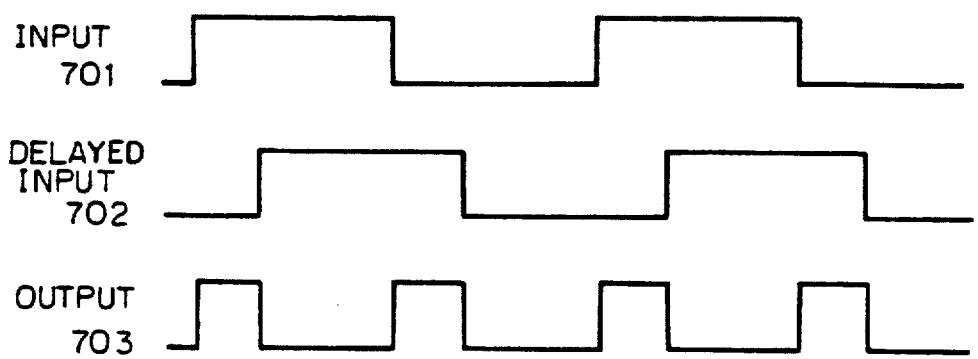
FIG. 7(B) is a timing diagram of the BND unit in the template matching memory.

Now, the operation of the BND unit is described by referring to FIGS. 7A and 7B. As indicated in FIG. 7A, to the upper input of the exclusive OR gate 702, the input signal delayed by a predetermined number of inverter stages is applied. Similarly, to the lower input of gate 702 the input signal applied to the terminal 701 is applied and, in response, gate 702 outputs a high level output pulse signal in accordance with the changing of the input signal. As a result, as shown in FIG. 7B, a signal having a doubled frequency of the input signal is output to the terminal 703. The data latch signals generated by coincidence element $C_{04}$ and applied to the data pair generation control unit 13 are also applied as an input signal to the BND unit.

The doubled frequency output of the BND unit causes the first word data stored in latches L13 and L14 and the second word data stored in either of latches L15 or L16 to be output as a first and second word of a two-word data packet during a single cycle by causing coincidence element $C_{05}$ to generate two data latch signals during a single cycle. Under control of the latch control signal generated by coincidence element $C_{05}$, the output data pair packet (consisting of address fields $A_{out}$, $B_{out}$ and data field $D_{out}$) is latched into output latch L17.

Referring now back to FIG. 2, if the result of the comparison of the high order address fields by comparator 14 is that the high order address fields do not match, then comparator 14 controls write control unit 15 so that no memory write and erase is executed. In addition, comparator 14 controls the operand R/L decision unit 18 so that the input data word D0 stored in latch L12 is passed directly through to latch L16 and from there to output latch L17. Consequently, the input data is output as it is.

Referring again to the FIG. 1, as described above, if a hash address collision occurred as indicated by the output of comparator 14, the input data packet along with the R/L operand order information is sent to the counter directional data loop pair generating mechanism comprising data loops 5 and 6 and firing detection unit 7. More particularly, the input data word is transmitted to the first data transmission line 5 or second data transmission line 6 via branch units 4a and 4b in accordance with the R/L operand order (the order indicating if it is the first or second operand of a two operand command).

Figure 8:
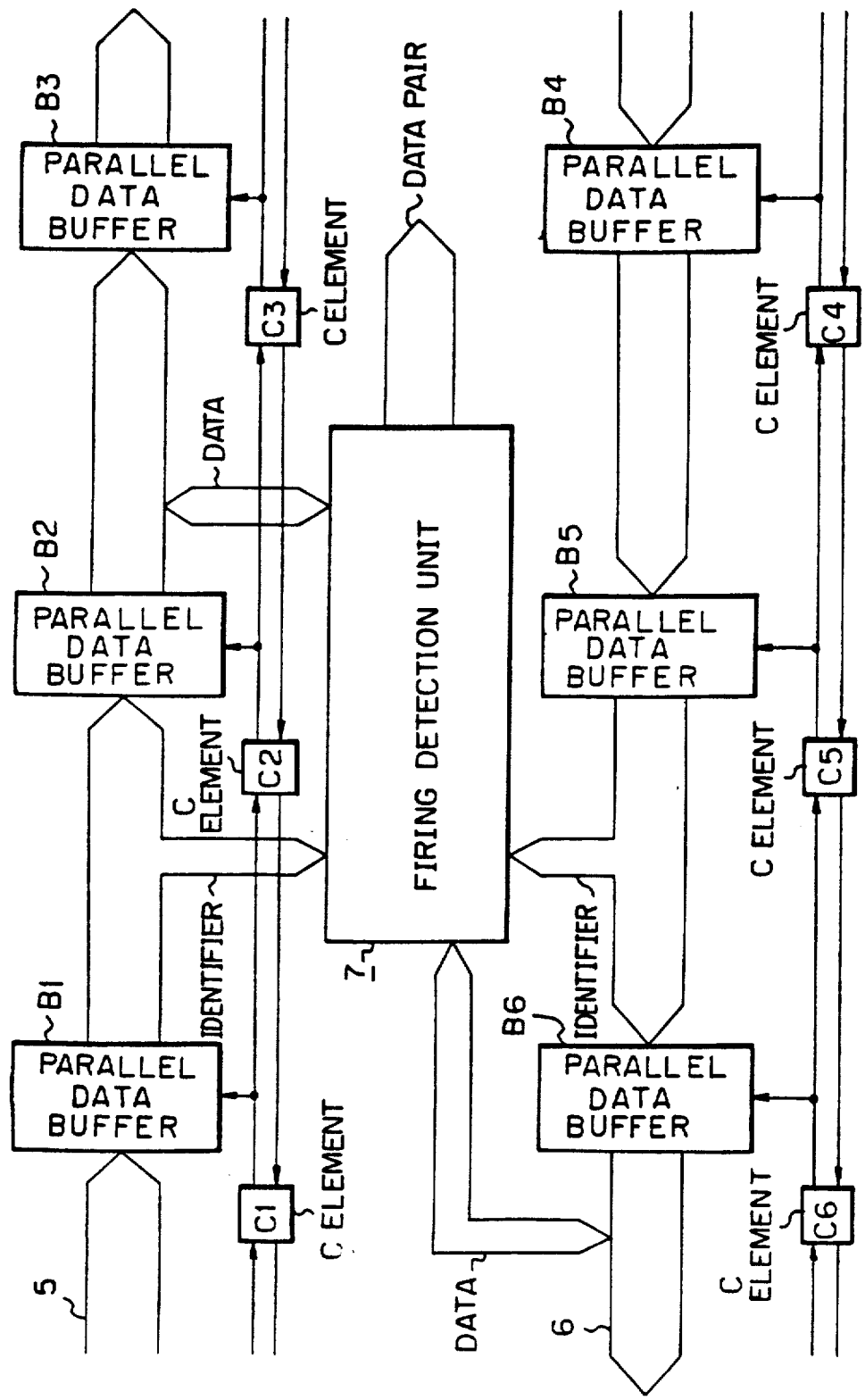
FIG. 8 is a schematic diagram for explaining the principle of the counter directional data loop data pair generating mechanism.

Now, the detail of the transmission line is explained by referring to FIG. 8. The first data transmission line 5 and the second data transmission line 6 which transfer the data in opposite directions through firing detection unit 7 are each constructed as a free running shift register. The free running shift register can push in and pop out independently the data at the same time. It shifts the pushed data toward the exit direction automatically when the next register stage is empty.

The free running shift register comprising the first data transmission line 5 has C elements (Coincident Element) C1 to C3 corresponding to the parallel data buffers B1 to B3 connected sequentially.

Figure 9:
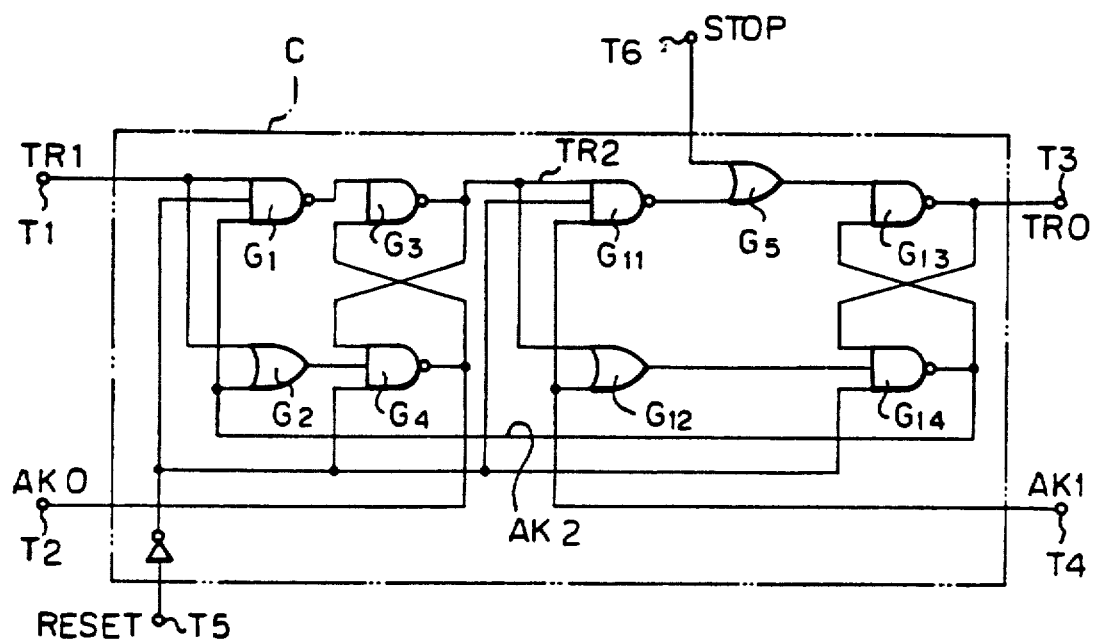
FIG. 9 is a circuit diagram showing an example of the C element.
Figure 10:
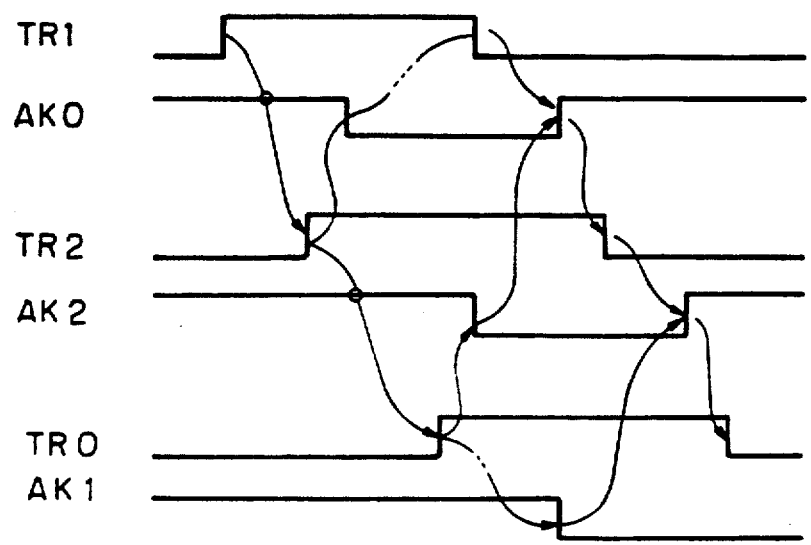
FIG. 10 is a timing diagram for explaining the circuit of FIG. 9.

Now, the C elements controlling the asynchronous free running shift register are described by referring to FIGS. 9 and 10. Each C element (C) has six terminals T1 to T6. To the terminal T1, a signal TR1 (Transfer In) is applied from the preceding C element and from the terminal T2, a signal AKO (Acknowledge Out) is output to the preceding C element. From the terminal T3, a TRO signal (Transfer Out) is output to a subsequent C element and to the terminal T4, and AKI (Acknowledge In) is applied from the subsequent C element. The signal TRO is further applied to a corresponding parallel data buffer as a transfer command signal. The signal AKI is applied as a buffer empty signal from one stage to its preceding stage.

Further, to the terminal T5, a reset signal is applied and to the terminal T6, a stop signal STOP is applied. In the circuit shown in FIG. 9, when a reset signal RESET is applied from the terminal T5, it is inverted by the inverter and the outputs from the four NAND gates G1, G4, G11 and G14 to which the inverted signal is applied are changed to a high level. When the outputs from the NAND gates G1, G4, G11 and G14 are at a high level, the output from both of the NAND gates G3 and G13 to which the output signal is applied are changed to a low level. The high level output signal from the NAND gates G4 becomes the signal AK0 and is applied to the preceding C element from the terminal T2 as the signal AK1. This latter signal indicates the empty condition of the corresponding parallel data buffer. At this time, if no data has reached the preceding parallel data buffer stage, the signal TR1 to the terminal T1 is at a low level When the reset signal RESET to the terminal T5 is released (becomes low), the output from the inverter changes to a high level and the signal AK2 from the NAND gate G14 is also at a high level. This condition is the initial state.

In the initial state, therefore, the two inputs of the NAND gates G1 and G11 are at a high level, respectively, and the one input of the OR gates G2 and G12 are also at a high level, respectively. Accordingly, the two inputs of both of the NAND gates G3 and G13 are at a high level, respectively, and therefore, the outputs from both of the NAND gates G3 and G13 are at a low level, respectively. That is, the signal TR2 and the signal TR0 from the terminal T3 are at a low level. The inputs of the NAND gates G4 and G14 are at a low level, high level and high level, respectively, and the outputs of the NAND gates G4 and G14 are changed to high levels, respectively.

When data is transmitted and the signal TR1 applied from a preceding C element to the terminal T1 is changed to a high level as shown in FIG. 10, all of the three inputs of the NAND gate G1 are changed to a high level and its output is changed to a low level. Then the output of the NAND gate G3 (that is the signal TR2 changes to a high level as shown in FIG. 10 and the output of the NAND gate G4 changes to a low level. When the signal TR2 changes to a high level, the output of the NAND gate G11 changes to a low level and the output TR0 of the NAND gate G13 changes to a high level and the output AK2 of the NAND gate G14 changes to a low level. The outputs of the NAND gates G4 and G14 are fed back to the inputs of the NAND gates G3 and G13, respectively, and the outputs of the NAND gates G3 and G13 are locked to a high level state. Thus the signal AKO from the terminal T2 changes to low as shown in FIG. 10. so that even if data is transmitted to the parallel buffer corresponding to the C element (C), the buffer will not receive further data transmission in such a state. The preceding stage of C element is informed of this fact by the AKO signal which is transmitted back to it. Further the output of the NAND gate G13 is at a high level and from the terminal T3 a high level signal TRO is applied to the next stage of C element. The high level signal TRO is applied to the corresponding parallel data buffer as a transfer command and the data in the parallel data buffer is transmitted to the next stage.

When the signal AKO changes to a low level, the signal TR1 also changes to a low level as shown in FIG. 10 and accordingly the output of the NAND gate G1 is changes back to a high level. Further as denoted above, the output AKO of the NAND gate G4 changes back to a high level and the output TR2 of the NAND gate G3 changes back to a low level by changing the output AK2 of the NAND gate G14 to a low level.

When the signal AKO from a subsequent C element, namely, the signal AK1, applied from the terminal T4 changes from a high level to a low level as shown in FIG. 10, that is when the empty state of the next stage of the parallel data buffer is detected, the input of the OR gate G12 changes to a low level and since the signal TR2 is also at a low level, the output of the OR gate G12 also changes to a low level. At that time, since the output of the NAND gate G13 is at a high level, the output of the NAND gate G14 changes to a high level. Accordingly, the input of the NAND gate G13 changes to a high level and the output of the NAND gate G13 changes to a low level. Thus the state of the circuit goes back to the same condition as the initial state.

When the signal AKO from a subsequent C element, namely, the signal AK1 appearing at terminal T4, is held at a low level, that is, if the parallel data buffer corresponding to the subsequent C element is not still empty one of the inputs of the NAND gate G11 is held to a low level. Thus, even if the signal TR2 changes to a high level by applying the signal TR1 from the terminal T1 as a high level, the NAND gate G11 does not operate and the signal TRO will not change to a high level. Therefore, data from the preceding stage is rejected and no data can be transferred to the parallel data buffer corresponding to that C element in such condition.

Further if a high level stop signal STOP is applied to this C element (C) from the terminal T6, the high level signal is applied to the NAND gate G13 via the OR gate G5. Accordingly, the output of the NAND gate G13 changes to a low level and, in this state, the signal TRO from the terminal T3 changes to a low level and is transferred to the next stage of C element and the data transfer is stopped.

In this manner, as shown in FIG. 8, the free running shift registers of the data transmission lines 5 and 6 are constructed from the parallel data buffers B1 to B3, the C elements C1 to C3, the parallel data buffers B4 to B6 and the C elements C3 to C6, respectively.

Further, in FIG. 8, identifier lines are extended from the data transmission lines connecting the parallel data buffer B1 to buffer B2 constituting the first transmission line 5 and from the data transmission lines connecting the parallel data buffer B5 to buffer B6 constituting the second transmission line. These identifier lines apply the value of the identifier field (high order address bits) accompanying the data to the firing detection unit. In the firing detection unit, the identifier fields are compared and, if necessary, data to be paired is retrieved from the data lines and a data pair is generated.

Figure 11:
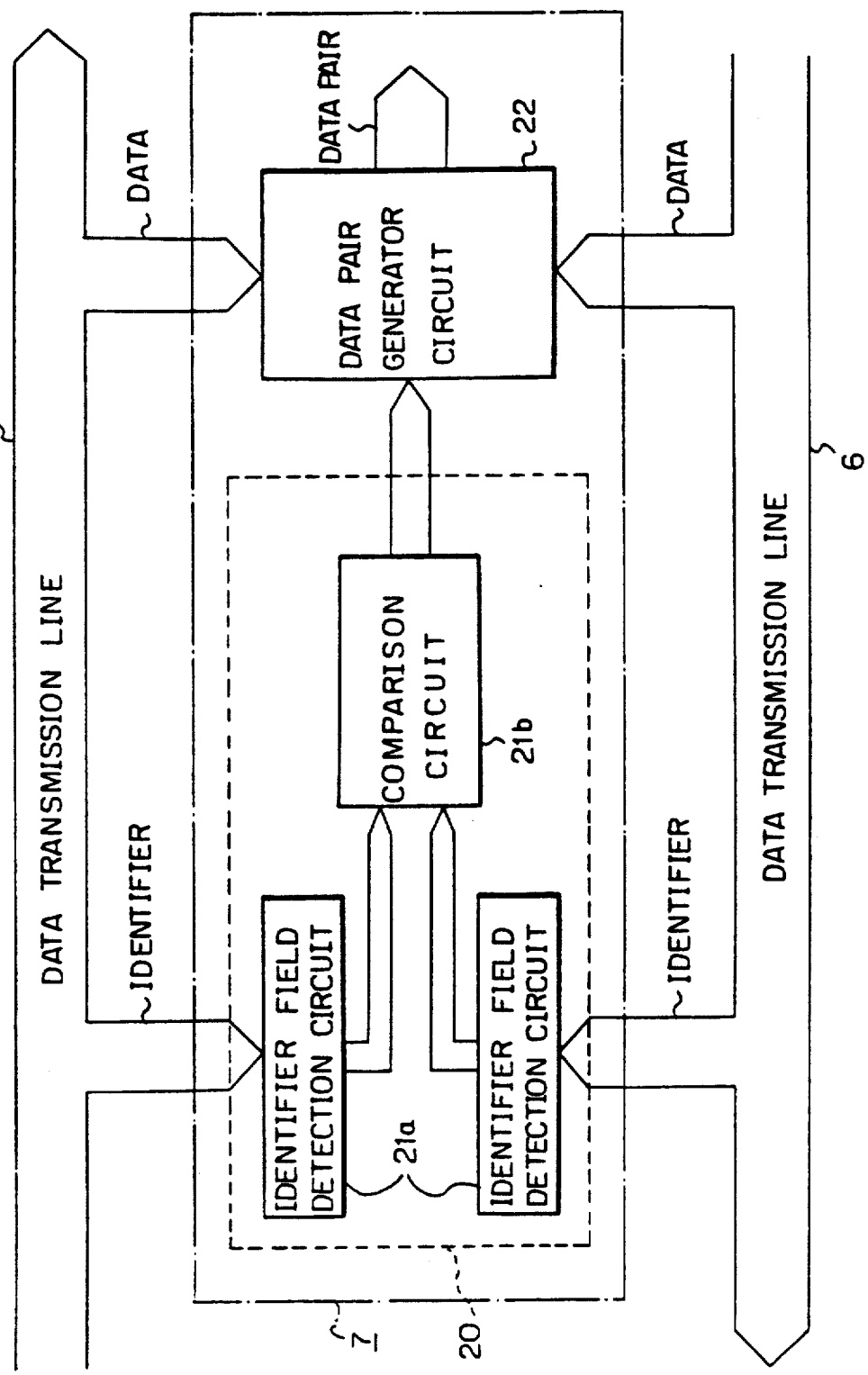
FIG. 11 is a schematic diagram for explaining generation of one data pair from the data to be paired in the counter directional comparison type data pair generating mechanism.

Next, the detail of the firing detection unit is explained by referring to FIG. 11. The data detection circuit 20 is comprised of identifier detection circuits 21a and a comparison circuit 21b. The identifier detection circuits 21a extract the identifier fields from the data transmitted in the first and second data transmission lines 5 and 6. The comparison circuit 21b compares the values of extracted identifier fields and a data pair generator circuit 22 receives a control signal from the comparison circuit and, in response to the signal, latches data words having the detected identifier fields. Then a data pair is generated by using the two latched data words and is output.

Figure 12A:
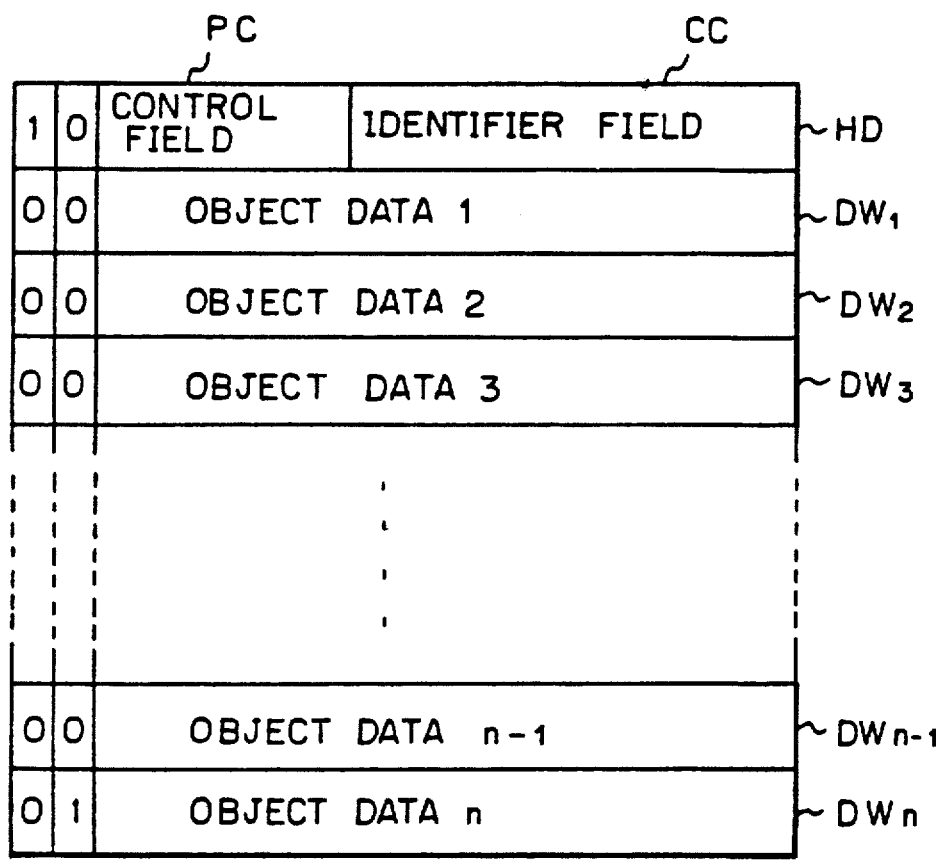
FIG. 12(A) is a diagram showing an example of the data format.
Figure 12B:
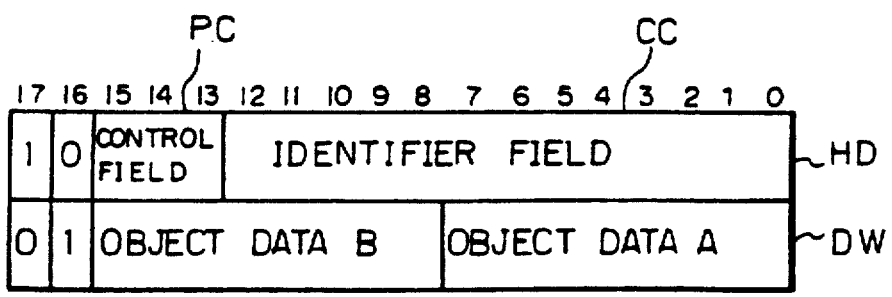
FIG. 12(B) is a diagram showing another example of the data format.
Figure 13:
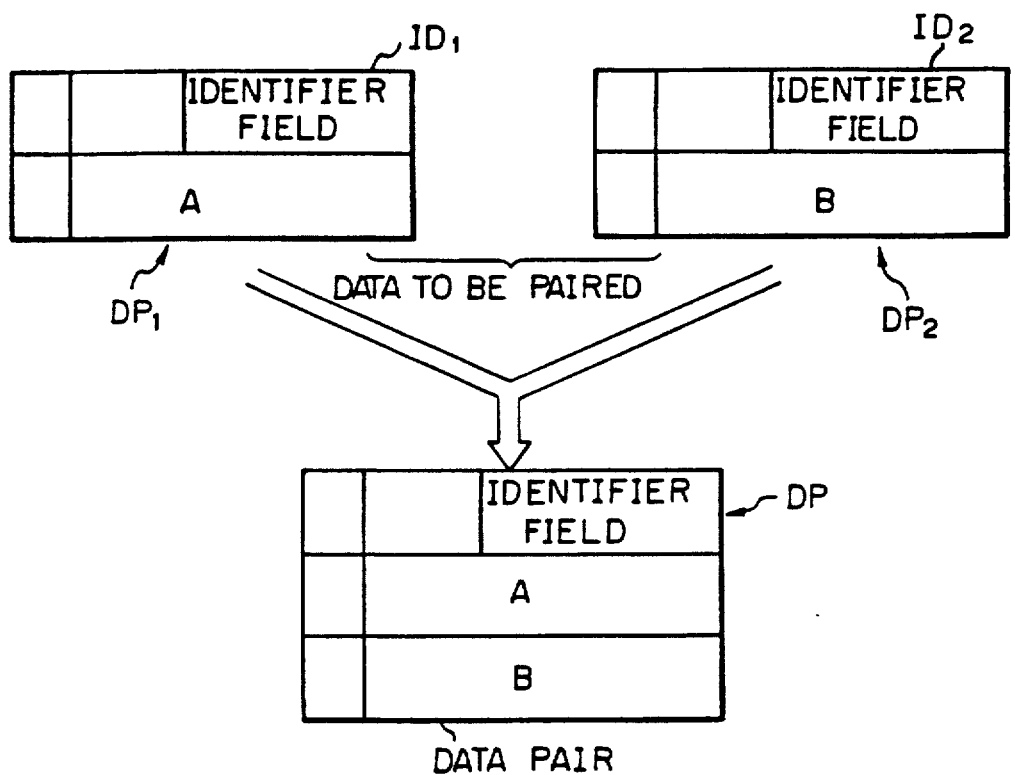
FIGS. 13 and 14 are schematic diagrams showing the formats of data and data pairs when one data pair is generated from the data to be paired, respectively.

More particularly, as shown in FIGS. 12 and 13, let us assume that input data packets DP1 and DP2 having their format as shown in FIG. 12(A) are transmitted in the first and second data transmission lines 5 and 6, respectively. Each data packet consists of a header portion HD and a plurality of data words $DW_1$—$DW_n$. The header portion, in turn consists of a control field PC and an identifier field CC. Each data word consists of n object data units 1—n. As shown in FIG. 13, From the transmission lines 5 and 6, the data having the identifier fields ID1 and ID2 are applied to the firing detection unit in which the two identifier fields ID1 and ID2 are extracted and compared with each other. If there is some predetermined relationship between the two identifier fields ID1 and ID2, for example, if the node information in the program structures are matched, this relationship is detected by the comparison circuit 21b. In response, the data pair detection circuit 20 specifies that the data DP1 and DP2 are to be paired with each other. The data pair generator circuit 22 reads the data packets DP1 and DP2 specified as above from the first and second data transmission lines 5 and 6, respectively, and generates a new data pair DP. This new data pair also has a data format as shown in FIG. 12(A).

Figure 14:
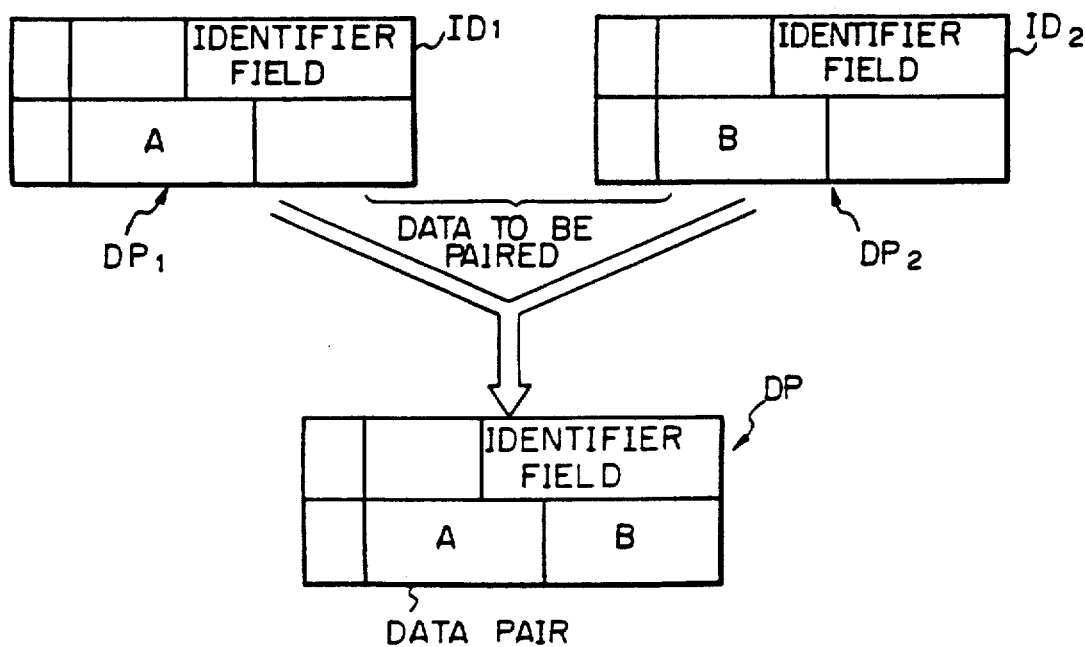

Further, as shown in FIG. 14, let us assume that input data packets DP1 and DP2 each having their format as shown in FIG. 12(B) are transmittted to the first and second data transmission lines 5 and 6, respectively. In a manner similar to the case illustrated in FIG. 13, the identifier fields ID1 and ID2 included in the data packets DP1 and DP2 are compared with each other and, if a predetermined relationship is detected, the data pair generator circuit 22 generates a new data pair DP as shown in FIG. 14. In this example shown in FIG. 14, the new data pair DP has a format as shown in FIG. 12(B).

Referring again to FIG. 1, the data pair generated by the data pair generator circuit leaves the firing detection unit 7 and is applied to the main data transmission line for subsequent operation via data transmission lines 5 or 6, the junction unit 8, the branch unit 9a and the junction unit 9b.

However, if no paired data is detected in the firing detection unit, the input data is re input to the template matching memory again via junction unit 8, branch unit 9a and junction unit 3.

Figure 15:
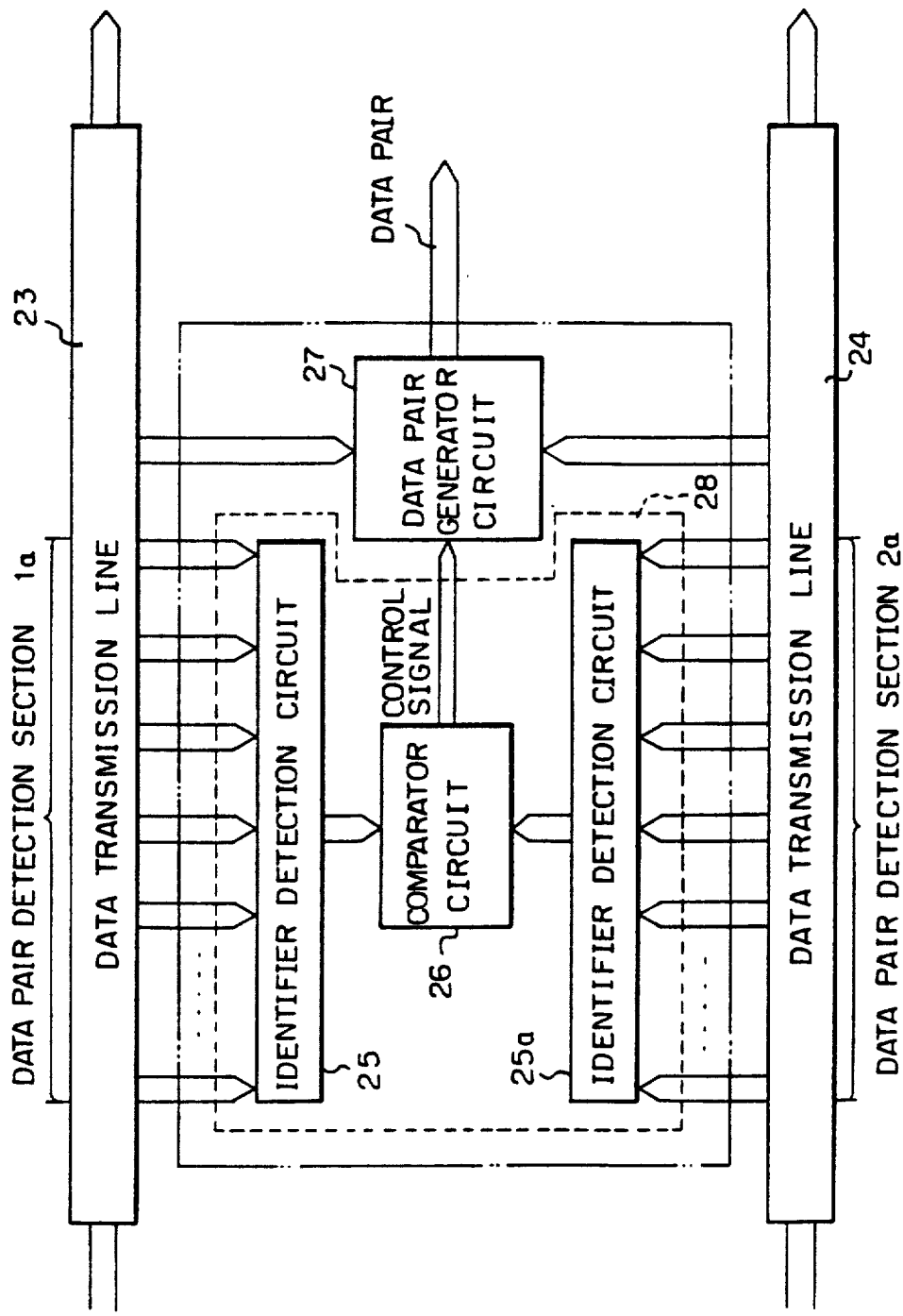
FIG. 15 is a block diagram showing another embodiment of the counter directional data loop data pair generating mechanism of this invention.

FIG. 15 is a block diagram showing another embodiment according to subject invention. In FIG. 15, another implementation of the data detection circuit in FIG. 11 is indicated. In this embodiment, data pair detection sections 1a and 2a having a predetermined length are established in the data transmission lines 23 and 24, an arrangement which facilitates the comparison in the comparison unit by extracting identifier fields simultaneously from multiple data packets. Thus, the identifier field from a particular data packet is available for a relatively long time period as it passes through several shift register stages. The data detection unit 28 in FIG. 15 comprises identifier detection circuits 25 and 25a, comparator circuit 26 and data pair generator circuit 27. The data packets in the register stages in section 1a are applied to an identifier detection circuit 25. Similarly, the data packets in the shift register stages in section 2a are applied to a second identifier circuit 25a. Identifier detection circuits 25 and 25a extract the appropriate identifier fields from the data packets and apply to identifier fields to comparator circuit 26. If the aforementioned predetermined relationship is detected in the extracted identifier fields, comparator 26 generates a control signal at the appropriate time which control signal, in turn, causes data pair generator circuit to generate a data pair from data words retrieved from the transmission lines 23 and 24.

Figure 16:
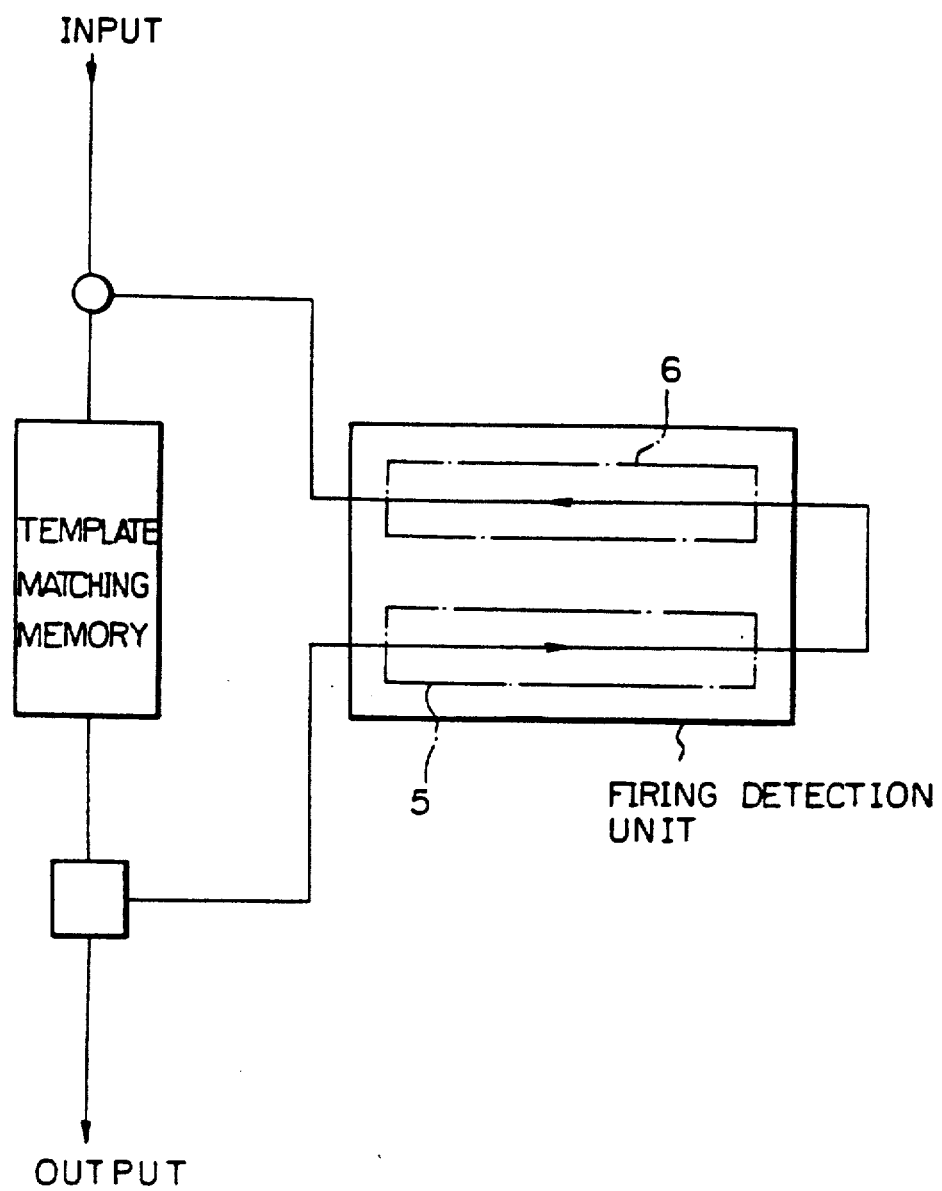
FIG. 16 is a schematic diagram showing the other embodiment of this invention.
Figure 17:
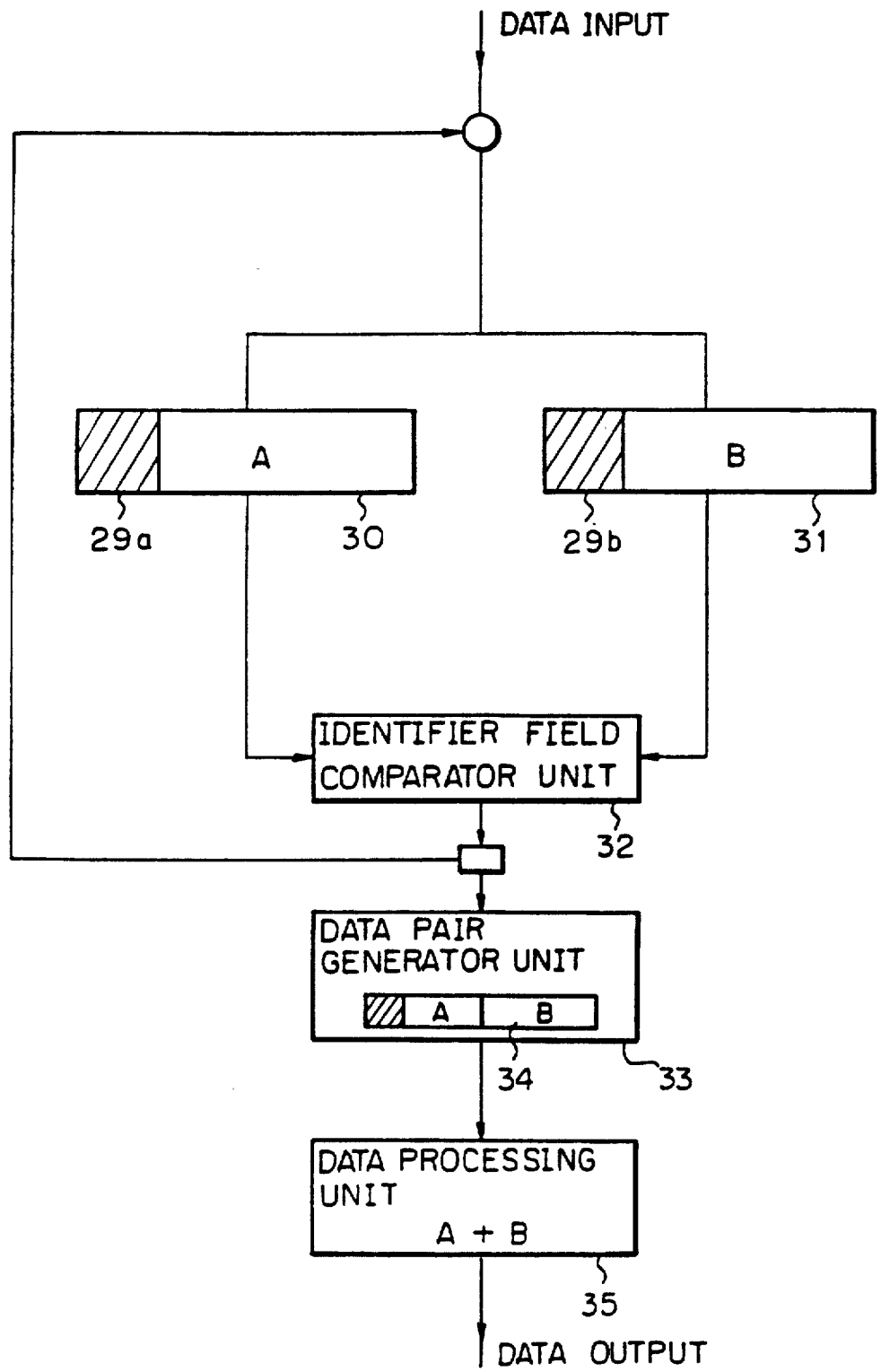
FIG. 17 is a schematic diagram showing the data driven type data processing system.

FIG. 16 is a schematic diagram showing another embodiment according to subject invention. Though in the embodiment as explained above, the data is branched to one of the first or the second transmission lines in accordance with the R/L order of operand, the arrangement shown in FIG. 16 can transmit the data to the first transmission line regardless of the order of operand as shown in FIG. 16 because the first data transmission line 5 and the second data transmission line 6 are connected in series. Thus, any data packets loaded into transmission line 5 will also travel through transmission line 6.

An embodiment of this invention has been described as a data driven type data processing system. However, the subject invention can generally be applied to an associative memory which reads out data from a memory by means of an identifier field (key word) in the input data and by matching the key word in the input data with a corresponding field in the data stored in the memory.

What is claimed is:

1. In a data-driven data processing system having a data storage memory, means for receiving an incoming stream of data words, each data word having an address field and an identifier field comprising a predetermined number of bits, address hashing means responsive to said address field in each data word for generating a hashed address for each data word with a number of bits less than said predetermined number, means responsive to a hashed address of a first data word for reading a second data word from said data storage memory using said first data word hashed address as a memory address, and means responsive to a first identifier field included in said first data word and responsive to a second identifier field included in said second data word for generating a data pair word when said first identifier field has a first predetermined relationship to said second identifier field, the improvement comprising:

means responsive to said first identifier field and to said second identifier field for loading said first data word into a first data loop register or a second data loop register when said first identifier field and said second identifier field do not have said first predetermined relationship, each data loop register having a plurality of stages; and means connected to register stages in said first data loop register and to register stages in said second data loop register and responsive to identifier fields in data words in said first data loop register and responsive to identifier fields in data words in said second data loop register for generating a data pair word when a third identifier field in a data word in said first data loop register has a second predetermined relationship to a fourth identifier field in a data word in said second data loop register.

2. In a data-driven data processing system, the improvement according to claim 1 wherein said first data loop register comprises a first shift register having a plurality of stages connected in a loop and said second data loop register comprises a second shift register having a plurality of stages connected in a loop.

3. In a data-driven data processing system, the improvement according to claim 2 further comprising means for shifting data words in said first shift register loop through said plurality of first shift register stages in a clockwise direction and means for shifting data words in said second shift register loop through said plurality of second shift register stages in a counter-clockwise direction.

4. In a data-driven data processing system, the improvement according to claim 1 wherein said data word address field comprises a plurality of low-order bits and a plurality of high-order bits and said address hashing means comprises means responsive to said data word address field for selecting a plurality of the low-order bits of said data word address field as said hashed address.

5. In a data-driven data processing system, the improvement according to claim 4 wherein said identifier field comprises a plurality of said high-order bits of said data word.

6. In a data-driven data processing system, the improvement according to claim 5 wherein said second data word comprises a data portion and an address portion and wherein said second identifier field is stored in said data storage memory together with said data portion of said second data word.

7. In a data-driven processing system having a data storage memory, apparatus for pairing a data word from said data storage memory with data words from an incoming data stream by comparing identifier fields contained within said data words, said apparatus comprising:

address hashing means responsive to an address field, said address field having a predetermined number of address bits in each data word, said address hashing means generating a hashed address for each data word from said incoming data stream, said hashed address having a number of bits less than said predetermined number;

means responsive to a hashed address of a first data word for reading a second data word from said data storage memory using said first data word hashed address as a memory address;

first means responsive to a first identifier field included in said first data word and responsive to a second identifier field included in said second data word for generating a data pair word when said first identifier field has a first predetermined relationship to said second identifier field;

means responsive to said first identifier field and to said second identifier field for loading said first data word into a first or second data loop register when said first identifier field and said second identifier field do not have said first predetermined relationship, each data loop register having a plurality of stages; and second means connected to register stages in said first data loop register and to register stages in said second data loop register and responsive to identifier fields in data words in said first data loop and responsive to identifier fields in data words in said second data loop for generating a data pair word when a third identifier field in a data word in said first data loop has a second predetermined relationship to a fourth identifier field in a data word in said second data loop.

8. In a data-driven data processing system, apparatus for pairing data words according to claim 7 wherein said first data loop register comprises a fist shift register having a plurality of stages connected in a loop and said second data loop register comprises a second shift register having a plurality of stages connected in a loop.

9. In a data-driven data processing system, apparatus for pairing data words according to claim 8 further comprising means for shifting data words in said first shift register through said plurality of first shift register stages in a clockwise direction and means for shifting data words in said second shift register through said plurality of second shift register stages in a counter-clockwise direction.

10. In a data-driven data processing system, apparatus for pairing data words according to claim 7 wherein said data word address field comprises a plurality of low-order bits and a plurality of high-order bits and said address hashing means comprises means responsive to said data word address field for selecting a plurality of the low-order bits of said data word address field as said hashed address.

11. In a data-driven data processing system, apparatus for pairing data words according to claim 10 wherein said first identifier field comprises a plurality of said high-order bits of said first data word and said second identifier field comprises a plurality of said high-order bits of said second data word.

12. In a data-driven data processing system, apparatus for pairing data words according to claim 11 wherein said second data word comprises a data portion and an address portion and wherein said second identifier field is stored in said data storage memory together with said data portion of said second data word.

13. In a data-driven data processing system, apparatus for pairing data words according to claim 7 further comprising means responsive to said second data word read out from said memory for generating an occupation signal,
    said occupation signal being stored in said data storage memory together with said second data word to generate a stored occupation signal,
    said occupation signal generating means setting the occupation signal to an on state when the stored occupation signal is in an off state and resetting said occupation signal to an off state when said stored occupation signal is in an on state,
    said apparatus further comprising means responsive to said stored occupation signal for writing said first data word into said memory.

14. In a data-driven data processing system, apparatus for pairing data words according to claim 7 further comprising means connecting said second generating means to said address hashing means for transferring said first data word from said second generating means to said address hashing means when said third identifier field does not have said second predetermined relationship to said fourth identifier field.

15. A data-driven processing system comprising:
    means for receiving a stream of incoming data words;
    a program storage memory for storing a plurality of codes, each code having a low-order bit field and a high-order bit field;
    means responsive to each incoming data word for reading said program memory and for appending to each data word one of said plurality of codes;
    a template matching memory;
    means responsive to a first low-order bit field of a code appended to a first data word for reading a data packet from said template matching memory using said first low-order bit field as a memory address, said data packet including a second data word and an appended code;
    first means responsive to a first code appended to said first data word and responsive to a second code appended to said data packet for generating a data pair word when a first high-order bit field of the first code has a first predetermined relationship to a second high-order bit field of said second code;
    means responsive to said first high-order bit field and to said second high-order bit field for loading said first data word and its appended code into a first or second data loop register when said first high-order bit field and said second high-order bit field do not have said first predetermined relationship, said data loop registers each having a plurality of stages;
    means for shifting data words in said first data loop register through said plurality of first data loop register stages in a clockwise direction and means for shifting data words in said second data loop register through said plurality of second data loop register stages in a counter-clockwise direction; and
    second means connected to said first and second data loop register stages and responsive to high-order bit fields of codes in said first and second data loop registers for generating a data pair word when a high-order bit field of a code in said first data loop register has a second predetermined relationship to a high-order bit field of a code in said second data loop register.

16. A data-driven data processing system according to claim 15 further comprising an arithmetic logic unit and means for applying a generated data pair to said arithmetic logic unit, said arithmetic logic unit processing said generated data pair and generating an output as a result thereof.

17. A data-driven data processing system, according to claim 15 further comprising means responsive to said data packet read out from said template matching memory for generating an occupation signal,
    said occupation signal being stored in said template matching memory together with said data packet to generate a stored occupation signal,
    said occupation signal generation means setting the occupation signal to an on state when the stored occupation signal is in an off state and resetting said occupation signal to an off state when said stored occupation signal is in an on state,
    said apparatus further comprising means responsive to said stored occupation signal for writing said first data word and said first high-order bit field into said template matching memory.

18. A data-driven data processing system according to claim 15 further comprising means connecting said second generating means to said reading means for transferring said first data word from said second generating means to said reading means when said high-order bit field in a code in said first data loop does not have said second predetermined relationship to said high-order bit field in a code in said second data loop register.

19. In a data-driven processing system having a data storage memory, a method of pairing data packets from said data storage memory with data packets from an incoming data stream by comparing identifier fields contained within said data packets, each of said data packets comprising a data word and a set of address bits divided into a first address bit subset and a second address bit subset, said method comprising the steps of:
    A. generating a hashed address from said first address bit subset for a first data packet from said incoming data stream;
    B. reading a second data packet from said data memory using said first data packet hashed address as a memory address;
    C. generating a data pair packet when said second address bit subset of said first data packet equals said second address bit subset of said second data packet;

D. loading said first data packet into a first or second data loop register when said second address bit subset of said first data packet and said second address bit subset of said second data packet are not equal, each of said data loop registers having a plurality of stages;

E. comparing first and second address bit subsets of selected data packets in said first data loop register to first and second address bit subsets of selected data packets in said second data loop register; and F. generating a data pair packet when both a first and second address bit subset of a data packet in said first data loop register equals a first and second address bit subset of a data packet in said second data loop register.

20. In a data-driven data processing system having a data storage memory, the method of pairing data packets according to claim 19 wherein step A comprises the step of:

A1. arranging bits in said first address bit subset in a predetermined order.

21. In a data-driven data processing system having a data storage memory, the method of pairing data packets according to claim 19 wherein step C comprises the steps of:

C1. forming a paired address by combining said first address bit subset and said second address bit subset in a predetermined order;

C2. forming a paired data word by combining a data word from said first data packet and a data word from said second data packet in a predetermined order; and C3. appending said paired data word to said paired address.

22. In a data-driven data processing system having a data storage memory, the method of pairing data packets according to claim 19 wherein step D comprises the steps of:

D1. continuously shifting data in said first data loop register in a clockwise direction; and D2. continuously shifting data in said second data loop register in a counter-clockwise direction.

23. In a data-driven data processing system having a data storage memory, the method of pairing data packets according to claim 19 wherein step E comprises the step of:

E1. comparing the second address bit subsets of data packets temporarily stored in predetermined stages of said first data loop register to second address bit subsets of data packets temporarily stored in predetermined stages of said second data loop register.

24. In a data-driven data processing system having a data storage memory, the method of pairing data packets according to claim 19 wherein step F comprises the steps of:

F1. forming a paired address by combining said first address bit subset and said second address bit subset in a predetermined order;

F2. forming a paired data word by combining a data word from said first data packet and a data word from said second data packet in a predetermined order; and F3. appending said paired data word to said paired address.

25. In a data-driven data processing system having a data storage memory, an apparatus for pairing data packets from said data storage memory with data packets from an incoming data stream by comparing identifier fields contained within said data packets, each of said data packets comprising a data word and a plurality of address bits, the identifier field of a data packet being a subset of said address bits, said apparatus comprising:

means for generating a hashed address for a first data packet from the plurality of address bits of said first data packet;

means for reading a second data packet from said data storage memory using said first data packet hashed address as a memory address;

first means for generating a paired data packet when the identifier field of said first data packet is equal to the identifier field of said second data packet;

a first data transmission line for transmitting unmatched data packets in a first direction;

a second data transmission line for transmitting unmatched data packets in a second direction, said second direction being opposite said first direction;

means for loading said first data packet into said first or second data transmission line when the identifier fields of said first data packet and said second data packet are not equal;

means for comparing the identifier field of unmatched data packets in the first data transmission line to the identifier field of unmatched data packets in said second data transmission line; and second means for generating a paired data packet from a first unmatched data packet in said first data transmission line and a second unmatched data packet in the second data transmission line when the identifier fields of said first and second unmatched data packets are equal, as determined by said means for comparing.

26. In a data-driven data processing system having a data storage memory, the apparatus according to claim 25 wherein said first means for generating a paired data packet comprises:

means for forming a paired address by combining the plurality of address bits and identifier field of said first data packet in a predetermined order;

means for forming a paired data word by combining a data word from said first data packet and a data word from said second packet in a predetermined order; and means for appending said paired data word to said paired address.

27. In a data-driven data processing system having a data storage memory, the apparatus according to claim 25 wherein said first data transmission line comprises a shift register means having a plurality of registers coupled in a loop configuration for continuously shifting data words in a clockwise direction and wherein said second data transmission line comprises a shift register means having a plurality of registers coupled in a loop configuration for continuously shifting data words in a counter-clockwise direction.

28. In a data-driven data processing system having a data storage memory, the apparatus according to claim 25 wherein said second means for generating a paired data packet from said first and second data packets comprises:

means for forming a paired address by combining the plurality of address bits and identifier field of said first unmatched data packet in a predetermined order;

means for forming a paired data word by combining a data word from said first unmatched data packet and a data word from said second unmatched data packet in a predetermined order; and means for appending said paired data word to said paired address.

* * * * *